United States Patent
Zhang et al.

(10) Patent No.: US 11,423,634 B2
(45) Date of Patent: Aug. 23, 2022

(54) OBJECT DETECTION MODEL TRAINING METHOD, APPARATUS, AND DEVICE

(71) Applicant: Huawei Cloud Computing Technologies Co., Ltd., Guizhou (CN)

(72) Inventors: Changzheng Zhang, Shenzhen (CN); Xin Jin, Beijing (CN); Dandan Tu, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 40 days.

(21) Appl. No.: 17/025,419

(22) Filed: Sep. 18, 2020

(65) Prior Publication Data

US 2021/0004625 A1    Jan. 7, 2021

Related U.S. Application Data

(63) Continuation of application No. PCT/CN2019/076982, filed on Mar. 5, 2019.

(30) Foreign Application Priority Data

Aug. 3, 2018 (CN) .......................... 201810878556.9
Sep. 13, 2018 (CN) .......................... 201811070244.1

(51) Int. Cl.
*G06K 9/00*    (2022.01)
*G06V 10/20*    (2022.01)
(Continued)

(52) U.S. Cl.
CPC ......... *G06V 10/255* (2022.01); *G06K 9/6215* (2013.01); *G06K 9/6218* (2013.01);
(Continued)

(58) Field of Classification Search
None
See application file for complete search history.

(56) References Cited

U.S. PATENT DOCUMENTS 7,295,687 B2    11/2007    Kee et al.
9,904,871 B2    2/2018    Merhav et al.
(Continued)

FOREIGN PATENT DOCUMENTS

CN    103150903 A    6/2013
CN    103324938 A    9/2013
(Continued)

OTHER PUBLICATIONS

Cheng, Bowen, et al. "Revisiting rcnn: On awakening the classification power of faster rcnn." Proceedings of the European conference on computer vision (ECCV). 2018. (Year: 2018).*
(Continued)

*Primary Examiner* — Sean M Conner
(74) *Attorney, Agent, or Firm* — Conley Rose, P.C.

(57) ABSTRACT

In an object detection model training method, a classifier that has been trained in a first phase is duplicated to at least two copies, and in a training in a second phase, each classifier obtained through duplication is configured to detect to-be-detected objects with different sizes, and train an object detection model based on a detection result.

20 Claims, 17 Drawing Sheets

(51) Int. Cl.
    *G06T 7/11* (2017.01)
    *G06K 9/62* (2022.01)
    *G06N 3/04* (2006.01)
    *G06V 10/44* (2022.01)

(52) U.S. Cl.
    CPC ......... *G06K 9/6256* (2013.01); *G06N 3/0454* (2013.01); *G06T 7/11* (2017.01); *G06V 10/454* (2022.01); *G06T 2207/20081* (2013.01)

(56) References Cited

U.S. PATENT DOCUMENTS

| | | | |
|---|---|---|---|
| 9,977,997 | B2 | 5/2018 | Bai et al. |
| 10,102,444 | B2 | 10/2018 | Kim et al. |
| 10,296,813 | B2 | 5/2019 | Chen et al. |
| 10,303,977 | B2 | 5/2019 | Wshah et al. |
| 10,417,525 | B2 | 9/2019 | Ji et al. |
| 10,438,112 | B2 | 10/2019 | Zhang et al. |
| 10,467,526 | B1 | 11/2019 | Appalaraju et al. |
| 10,769,532 | B2 | 9/2020 | Dang et al. |
| 2004/0179719 | A1 | 9/2004 | Chen et al. |
| 2017/0083752 | A1 | 3/2017 | Saberian et al. |
| 2017/0206431 | A1 | 7/2017 | Sun et al. |
| 2017/0220904 | A1 | 8/2017 | Bai et al. |
| 2018/0025256 | A1 | 1/2018 | Bai et al. |
| 2018/0060698 | A1 | 3/2018 | Hua et al. |
| 2018/0211107 | A1 | 7/2018 | Segalovitz et al. |

FOREIGN PATENT DOCUMENTS

| | | |
|---|---|---|
| CN | 103426008 A | 12/2013 |
| CN | 103942558 A | 7/2014 |
| CN | 104217216 A | 12/2014 |
| CN | 104794501 A | 7/2015 |
| CN | 104866810 A | 8/2015 |
| CN | 105184312 A | 12/2015 |
| CN | 105678267 A | 6/2016 |
| CN | 105760833 A | 7/2016 |
| CN | 105760859 A | 7/2016 |
| CN | 105868797 A | 8/2016 |
| CN | 105912990 A | 8/2016 |
| CN | 105931255 A | 9/2016 |
| CN | 105975931 A | 9/2016 |
| CN | 106156807 A | 11/2016 |
| CN | 106295714 A | 1/2017 |
| CN | 106548159 A | 3/2017 |
| CN | 106570522 A | 4/2017 |
| CN | 106599900 A | 4/2017 |
| CN | 106778472 A | 5/2017 |
| CN | 106845529 A | 6/2017 |
| CN | 107273897 A | 10/2017 |
| CN | 107437081 A | 12/2017 |
| CN | 107463919 A | 12/2017 |
| CN | 107609519 A | 1/2018 |
| CN | 107622272 A | 1/2018 |
| CN | 108038474 A | 5/2018 |
| CN | 108073917 A | 5/2018 |
| CN | 108108676 A | 6/2018 |
| CN | 108109385 A | 6/2018 |
| CN | 108256562 A | 7/2018 |
| CN | 108304820 A | 7/2018 |
| CN | 108399454 A | 8/2018 |
| EP | 3065085 A1 | 9/2016 |

OTHER PUBLICATIONS

Ren, Shaoqing, et al. "Faster r-cnn: Towards real-time object detection with region proposal networks." Advances in neural information processing systems 28 (2015). (Year: 2015).*

Eggert, Christian, et al. "A closer look: Small object detection in faster R-CNN." 2017 IEEE international conference on multimedia and expo (ICME). IEEE, 2017. (Year: 2017).*

Zhen, O., et al., "Research of Image Classification Based on Transformable Convolutional Network," Software Guide , vol. 16, No. 6, Jun. 2017, with an English abstract, 4 pages.

Xu, Z., et al., "Deformable ConvNet with Aspect Ratio Constrained NMS for Object Detection in Remote Sensing Imagery," Remote Sens., 2017, 19 pages.

Dai, J., "Deformable Convolutional Networks," IEEE International Conference on Computer Vision, 2017, 10 pages.

XP081232887, Hu, X., et al., "SINet: A Scale-insensitive Convolutional Neural Network for Fast vehicle Detection," IEEE Transactions on Intelligent Transportation Systems, vol. 20, No. 3, May 16, 2018, 10 pages.

Wang, Y., "Detecting Faces Using Region-based Fully Convolutional Networks," Sep. 18, 2017, 10 pages.

Wang, H., "Face R-CNN," Jun. 4, 2017, 10 pages.

Du Lan, et al., "Target Detection Method Based on Convolutional Neural Network for SAR Image," Journal of Electronics and Information Technology, vol. 38, No. 12, Dec. 2016, with an English abstract, 8 pages.

Luo Haibo, et al., "Pedestrian detection algorithm based on dual-model fused fully convolutional networks (Invited)," Infrared and Laser Engineering, vol. 47, No. 2, Feb. 2018, with an English abstract, 8 pages.

* cited by examiner

OBJECT DETECTION MODEL TRAINING METHOD, APPARATUS, AND DEVICE

CROSS-REFERENCE TO RELATED APPLICATIONS

This application is a continuation of International Patent Application No. PCT/CN2019/076982 filed on Mar. 5, 2019, which claims priority to both Chinese Patent Application No. 201811070244.1 filed on Sep. 13, 2018 and Chinese Patent Application No. 201810878556.9 filed on Aug. 3, 2018, the disclosures of which are hereby incorporated by reference in their entireties.

TECHNICAL FIELD

This application relates to the field of computer technologies, and in particular, to an object detection model training method, and an apparatus and a computing device for performing the method.

BACKGROUND

Object detection is an artificial intelligence technology used for accurately locating and detecting, by type, objects in an image or video. The object detection includes a plurality of segment fields such as general object detection, face detection, pedestrian detection, and text detection. In recent years, with much research in the academic and industrial circles and increasingly mature algorithms, a deep learning based object detection solution has been used for actual products in municipal security protection (pedestrian detection, vehicle detection, license plate detection, and the like), finance (object detection, face scanning login, and the like), the internet (identity verification), intelligent terminals, and the like.

Currently, the object detection is widely applied to a plurality of simple/medium-complex scenarios (for example, face detection in an access control scenario or a checkpoint scenario). In an open environment, how to maintain robustness of a trained object detection model against a plurality of adverse factors such as a greatly changeable size, blocking, and distortion of a to-be-detected object and improve detection precision is still a problem to be resolved.

SUMMARY

This application provides an object detection model training method. The method improves detection precision of a trained object detection model.

According to a first aspect, an object detection model training method performed by a computing device is provided, where the computing device performing the method may be one or more computing devices distributed in a same environment or different environments. The method includes obtaining a training image, and establishing a backbone network based on the training image, inputting, into a region proposal network, feature maps output by the backbone network, selecting, by the region proposal network based on a region proposal parameter, a plurality of proposal regions from the feature maps output by the backbone network, and inputting feature submaps corresponding to the plurality of proposal regions into a classifier, detecting, by the classifier, a to-be-detected object in the training image based on the feature submaps corresponding to the plurality of proposal regions, comparing the detected result, detected by the classifier, in the training image with a prior result of the training image, and exciting at least one of a model parameter of a convolution kernel of the backbone network, a model parameter of a convolution kernel of the region proposal network, the region proposal parameter, or a parameter of the classifier based on the comparison result, duplicating the classifier to obtain at least two classifiers, classifying, by the region proposal network, the plurality of proposal regions into at least two proposal region sets, where each proposal region set includes at least one proposal region, inputting, by the region proposal network into one of the at least two classifiers, a feature submap corresponding to a proposal region included in each proposal region set, performing, by each of the at least two classifiers, the following actions detecting a to-be-detected object in the training image based on a feature submap corresponding to a proposal region included in an obtained proposal region set, and comparing the detection result with the prior result of the training image, and exciting at least one of the model parameter of the convolution kernel of the backbone network, the model parameter of the convolution kernel of the region proposal network, the region proposal parameter, or a parameter of each classifier based on the comparison result.

Each of the at least two classifiers excites a parameter of the classifier based on the comparison result, but usually skips exciting parameters of other classifiers in the at least two classifiers based on the comparison result.

According to the forgoing method, the training image is input into an object detection model twice, to train the object detection model. In a training in a first phase, a size of a to-be-detected object is not distinguished such that a trained classifier has a global view. In a training in a second phase, each classifier obtained through duplication is responsible for detecting a to-be-detected object in a proposal region set, that is, responsible for detecting to-be-detected objects with approximate sizes such that each trained classifier is further more sensitive to corresponding to-be-detected objects with different sizes. The trainings in the two phases improve precision of the trained object detection model for detecting the to-be-detected objects with different sizes.

In a possible implementation, the method further includes obtaining a system parameter, where the system parameter includes at least one of the following a quantity of size clusters of to-be-detected objects in the training image or a training computing capability, and determining, based on the system parameter, a quantity of classifiers that are obtained through duplication and that are in the at least two classifiers.

The quantity of classifiers obtained through duplication may be manually configured, or may be calculated based on a condition of the to-be-detected objects in the training image, and the quantity of classifiers obtained through duplication is properly selected. This further improves the precision of the trained object detection model for detecting the to-be-detected objects with different sizes.

In a possible implementation, when the system parameter includes the quantity of size clusters of the to-be-detected objects in the training image, the obtaining a system parameter includes performing clustering on sizes of the to-be-detected objects in the training image, to obtain the quantity of size clusters of the to-be-detected objects in the training image.

In a possible implementation, the feature maps output by the backbone network include at least two feature maps.

Different convolution layers of the backbone network may be corresponding to different strides. Therefore, to-bedetected objects in proposal regions in feature maps output at the different convolution layers may also have different sizes, and at least two feature maps are extracted by the backbone network. In this way, sources of proposal regions are increased, and the precision of the trained object detection model for detecting the to-be-detected objects with different sizes is further improved.

A second aspect of this application provides a detection model training apparatus, including an initialization module, an object detection model, and an excitation module.

The object detection model is configured to obtain a training image, and establish a backbone network based on the training image, select, based on a region proposal parameter, a plurality of proposal regions from feature maps output by the backbone network, and input feature submaps corresponding to the plurality of proposal regions into a classifier, and detect a to-be-detected object in the training image based on the feature submaps corresponding to the plurality of proposal regions.

The excitation module is configured to compare the detection result with a prior result of the training image, and excite at least one of a model parameter of a convolution kernel of the backbone network, a model parameter of a convolution kernel of a region proposal network, the region proposal parameter, or a parameter of the classifier based on the comparison result.

The initialization module is configured to duplicate the classifier to obtain at least two classifiers.

The object detection model is further configured to classify the plurality of proposal regions into at least two proposal region sets, where each proposal region set includes at least one proposal region, and input, into one of the at least two classifiers, a feature submap corresponding to a proposal region included in each proposal region set. Each of the at least two classifiers performs the following actions detecting a to-be-detected object in the training image based on a feature submap corresponding to a proposal region included in an obtained proposal region set, and comparing the detection result with the prior result of the training image, and exciting at least one of the model parameter of the convolution kernel of the backbone network, the model parameter of the convolution kernel of the region proposal network, the region proposal parameter, or a parameter of each classifier based on the comparison result.

In a possible implementation, the initialization module is further configured to obtain a system parameter, where the system parameter includes at least one of the following a quantity of size clusters of to-be-detected objects in the training image or a training computing capability, and determine, based on the system parameter, a quantity of classifiers that are obtained through duplication and that are in the at least two classifiers.

In a possible implementation, the initialization module is further configured to perform clustering on sizes of the to-be-detected objects in the training image, to obtain the quantity of size clusters of the to-be-detected objects in the training image.

In a possible implementation, the feature maps output by the backbone network include at least two feature maps.

A third aspect of this application provides a computing device system. The computing device system includes at least one computing device. Each computing device includes a processor and a memory. A processor of the at least one computing device is configured to access code in the memory to perform the method according to any one of the first aspect or the possible implementations of the first aspect.

A fourth aspect of this application provides a non-transient readable storage medium. When the non-transient readable storage medium is executed by at least one computing device, the at least one computing device performs the method according to any one of the first aspect or the possible implementations of the first aspect. The storage medium stores a program. Types of the storage medium include but are not limited to a volatile memory, for example, a random-access memory (RAM), or a non-volatile memory such as a flash memory, a hard disk drive (HDD), or a solid-state drive (SSD).

A fifth aspect of this application provides a computing device program product. When the computing device program product is executed by at least one computing device, the at least one computing device performs the method according to any one of the first aspect or the possible implementations of the first aspect. The computing device program product may be a software installation package. When the method according to any one of the first aspect or the possible implementations of the first aspect needs to be used, the computing device program product may be downloaded to and executed on a computing device.

A sixth aspect of this application provides another object detection model training method performed by a computing device. The method includes trainings in two phases.

In a training in a first phase, a backbone network extracts feature maps of a training image, a region proposal network selects proposal regions from the extracted feature maps, and inputs feature submaps corresponding to the proposal regions into a classifier, and the classifier detects a to-be-detected object in the training image based on the feature submaps corresponding to the proposal regions, compares the detection result with a prior result of the training image, and excites at least one of the backbone network, the region proposal network, or the classifier based on the comparison result.

In a training in a second phase, at least two classifiers obtained through duplication are established based on the classifier that has undergone the training in the first phase, and the region proposal network classifies the proposal regions into at least two proposal region sets, where each proposal region set includes at least one proposal region, and inputs, into one classifier obtained through duplication, a feature submap corresponding to a proposal region included in each proposal region set, and each classifier obtained through duplication detects a to-be-detected object in the training image based on an obtained feature submap, and compares the detection result with the prior result of the training image, and re-excites at least one of the backbone network, the region proposal network, or the classifier based on the comparison result.

In the training in the second phase, the classifier that has undergone the training in the first phase may be duplicated, to establish the at least two classifiers obtained through duplication. Alternatively, the classifier that has undergone the training in the first phase may be adjusted and then duplicated, to establish the at least two classifiers obtained through duplication.

In a possible implementation, the method further includes obtaining a system parameter, where the system parameter includes at least one of the following a quantity of size clusters of to-be-detected objects in the training image or a training computing capability, and determining, based on the system parameter, a quantity of established classifiers obtained through duplication.

In a possible implementation, when the system parameter includes the quantity of size clusters of the to-be-detected objects in the training image, the obtaining a system parameter includes performing clustering on sizes of the to-be-detected objects in the training image, to obtain the quantity of size clusters of the to-be-detected objects in the training image.

In a possible implementation, the feature maps extracted by the backbone network include at least two feature maps.

A seventh aspect of this application provides a computing device system. The computing device system includes at least one computing device. Each computing device includes a processor and a memory. A processor of the at least one computing device is configured to access code in the memory to perform the method according to any one of the sixth aspect or the possible implementations of the sixth aspect.

An eighth aspect of this application provides a non-transient readable storage medium. When the non-transient readable storage medium is executed by at least one computing device, the at least one computing device performs the method according to any one of the sixth aspect or the possible implementations of the sixth aspect. The storage medium stores a program. Types of the storage medium include but are not limited to a volatile memory, for example, a RAM, or a non-volatile memory such as a flash memory, an HDD, or an SSD.

A ninth aspect of this application provides a computing device program product. When the computing device program product is executed by at least one computing device, the at least one computing device performs the method according to any one of the sixth aspect or the possible implementations of the sixth aspect. The computing device program product may be a software installation package. When the method according to any one of the sixth aspect or the possible implementations of the sixth aspect needs to be used, the computing device program product may be downloaded to and executed on a computing device.

BRIEF DESCRIPTION OF DRAWINGS

To describe the technical solutions in the embodiments of this application more clearly, the following briefly describes the accompanying drawings required for the embodiments.

DESCRIPTION OF EMBODIMENTS

The following describes the technical solutions in the embodiments of this application with reference to the accompanying drawings in the embodiments of this application.

In this application, there is no logical or temporal dependency relationship between "first", "second", and "$n^{th}$".

Figure 1:
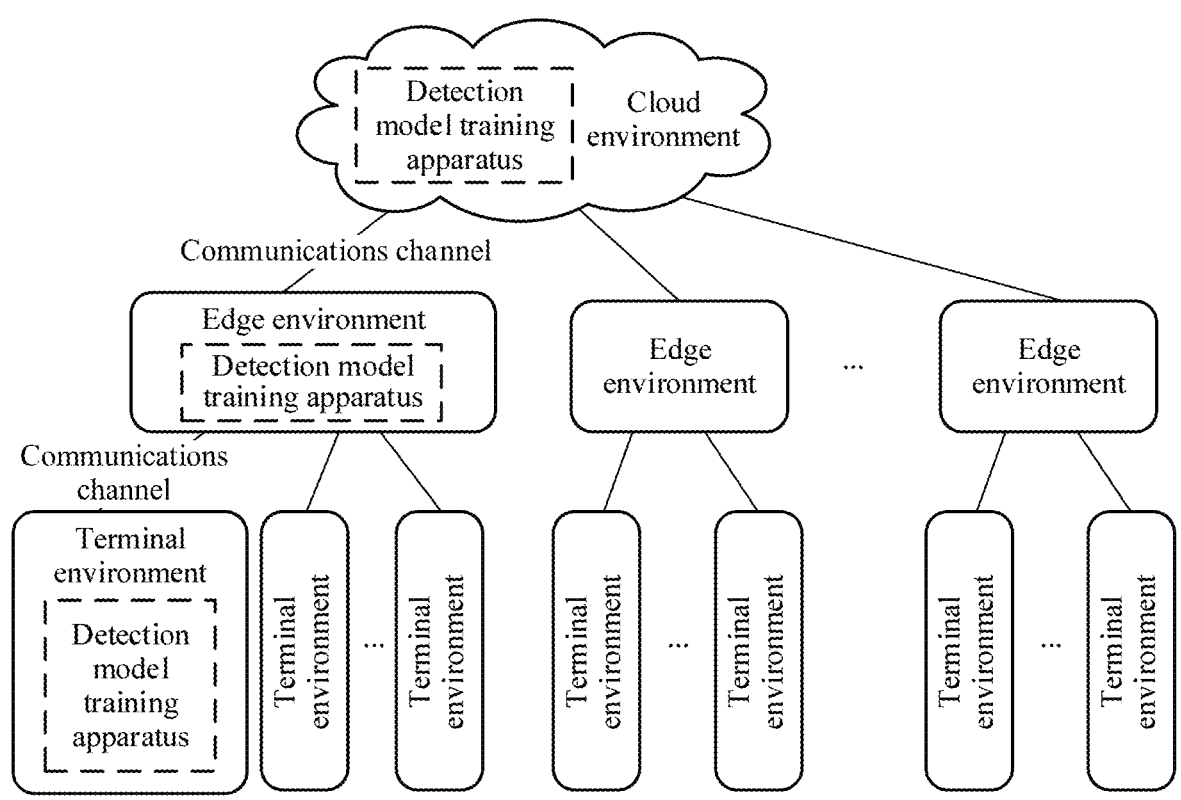
FIG. 1 is a schematic diagram of a system architecture according to this application.

As shown in FIG. 1, an object detection model training method provided in this application is performed by a detection model training apparatus. The apparatus may run in a cloud environment, and specifically run on one or more computing devices in the cloud environment. Alternatively, the apparatus may run in an edge environment, and specifically run on one or more computing devices (or edge computing devices) in the edge environment. Alternatively, the apparatus may run in a terminal environment, and specifically run on one or more terminal devices in the terminal environment. The terminal device may be a mobile phone, a notebook computer, a server, a desktop computer, or the like. The edge computing device may be a server.

Figure 2:
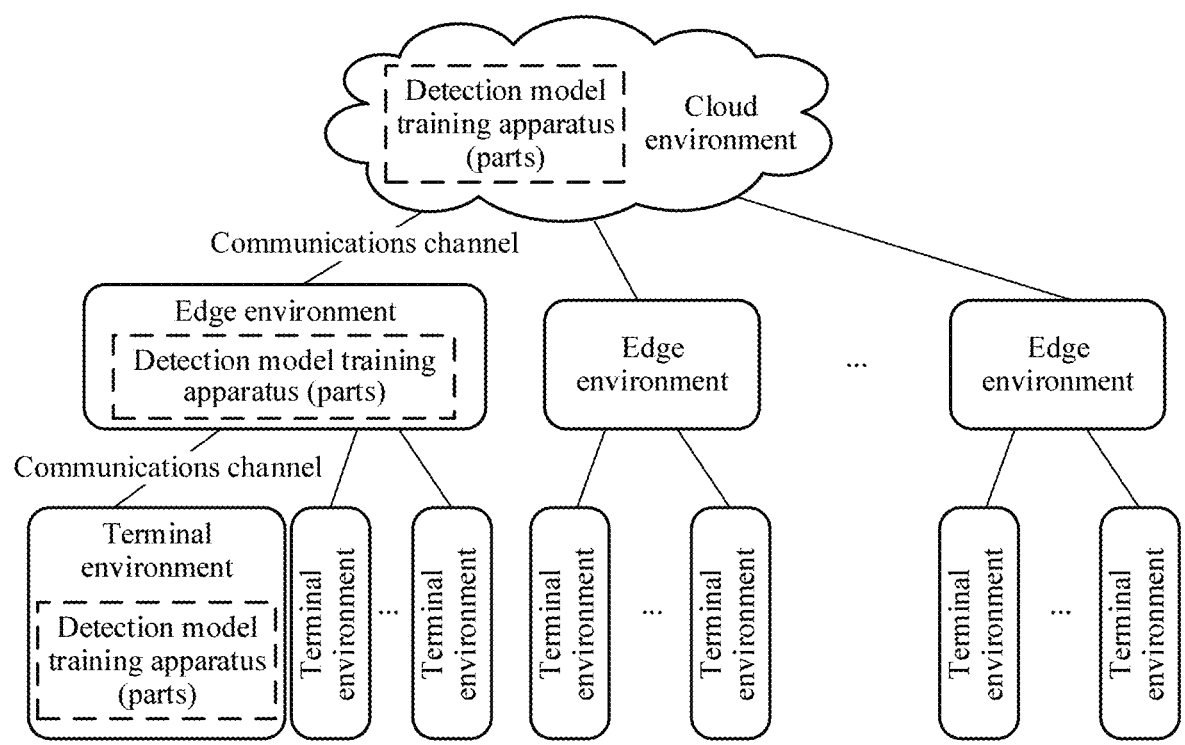
FIG. 2 is a schematic diagram of another system architecture according to this application.

As shown in FIG. 2, a detection model training apparatus may include a plurality of parts (modules), and all parts of the detection model training apparatus may be separately deployed in different environments. For example, some modules of the detection model training apparatus may be deployed in three or any two of a cloud environment, an edge environment, and a terminal environment.

FIG. 3 to FIG. 5 and FIG. 6 to FIG. 8 are separately schematic diagrams of two working procedures of a detection model training apparatus. In each working procedure, a detection model training apparatus has trainings in two phases in a training state in two phases.

Figure 3:
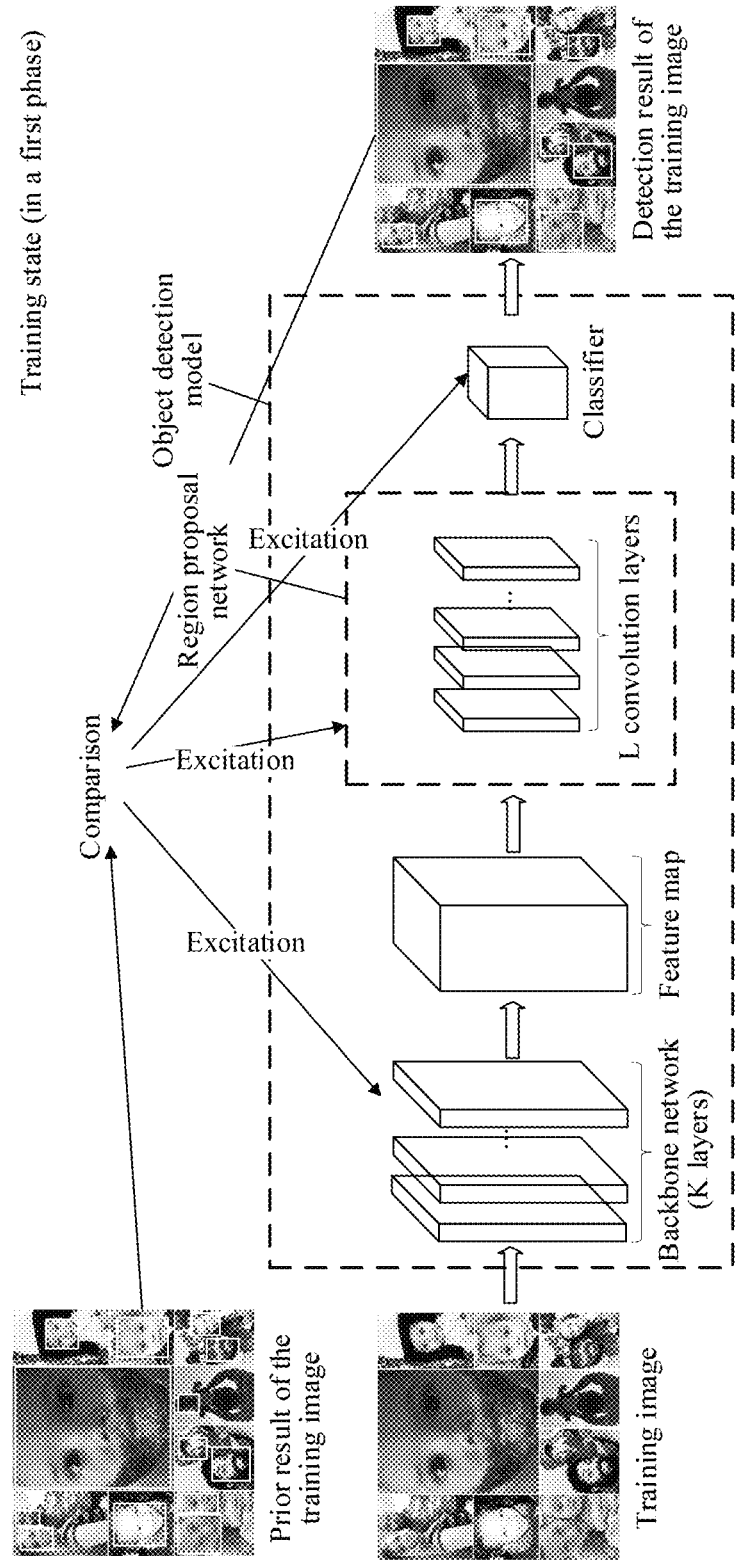
FIG. 3 is a diagram of a working procedure of a detection model training apparatus in a training state according to this application.

In FIG. 3, a detection model training apparatus operates in a first phase in a training state. An objective of the training state is to train an object detection model with relatively high precision using a training image and a prior result of the training image. The prior result of the training image includes a mark of a to-be-detected object in the training image. A training image in FIG. 3 is used as an example. The training image includes a plurality of faces. In a prior result of the training image, each face in the training image is marked using a white box (shown in the upper left corner in FIG. 3). The prior result of the training image may be usually provided manually.

A backbone network with K layers is established based on the training image. The backbone network includes K convolution layers, where K is a positive integer greater than 0. The backbone network extracts a feature map from the training image. The feature map extracted by the backbone network is input into a region proposal network. The region proposal network selects a proposal region from the feature map, and inputs a feature submap corresponding to the proposal region into a classifier. In a process of selecting the proposal region from the feature map, the region proposal network may directly obtain, by comparing the prior result of the training image with the feature map, a region with high coverage of a to-be-detected object in the feature map and a region with high coverage of the to-be-detected object in the training image, and use the regions as proposal regions. Alternatively, the region proposal network may first identify a foreground region and a background region in the feature map, and then extract the proposal region from the foreground region. The foreground region is a region that includes a relatively large amount of information and in which the to-be-detected object is included with a relatively high probability. The background region is a region that includes a relatively small amount of information or a relatively large amount of redundant information and in which the to-be-detected object is included with a relatively low probability.

Each feature submap includes some features that are included in the feature map and located in the proposal region. The classifier determines, based on a feature submap, whether the to-be-detected object is located in a region that is in the training image and that corresponds to a proposal region corresponding to the feature submap. As shown on the right side in FIG. 3, the classifier marks a detected face region in the training image using a white box. A difference between a to-be-detected object currently detected by the detection model training apparatus and a prior result may be obtained by comparing a detection result of the training image with the prior result of the training image. As shown in FIG. 3, some faces in the prior result have not been detected by the detection model training apparatus. Each parameter of the object detection model is excited based on the difference. The parameter includes at least one of the following a model parameter of a convolution kernel at each convolution layer of the backbone network, a model parameter of a convolution kernel of the region proposal network, a region proposal parameter of the region proposal network, or a parameter of the classifier. Each parameter of the object detection model is excited based on a difference between a detection result of each training image and a prior result of the training image. Therefore, after a large quantity of training images are excited, precision of the object detection model is improved.

The detection model training apparatus trains the object detection model using a large quantity of training images and prior results of the training images. The object detection model includes the backbone network, the region proposal network, and the classifier. After the first phase in the training mode, the object detection model enters a second phase in the training mode, as shown in FIG. 4.

In the second phase in the training mode, the classifier that has undergone the first phase in FIG. 3 is first duplicated to P copies. A training image is input into the backbone network, and a feature map extracted by the backbone network is input into the region proposal network. The region proposal network selects proposal regions from the feature map, and aggregates the selected proposal regions to P proposal region sets based on sizes of the proposal regions. Proposal regions in each proposal region set have approximate sizes. Feature submaps corresponding to the P proposal region sets are separately input into P classifiers. One proposal region set corresponds to one classifier, and a feature submap corresponding to a proposal region in the proposal region set is input into the classifier. Each classifier detects to-be-detected objects with different sizes in the training image based on a received feature submap, to obtain a corresponding detection result. A detection result of each classifier is compared with a prior result of a size of a to-be-detected object that is in the training image and that corresponds to a feature submap received by the classifier. Each parameter of the object detection model is excited based on a difference between a detection result of a to-be-detected object with each size and a prior result of the to-be-detected object with the size. Particularly, each classifier is trained to be more sensitive to the to-be-detected objects with different sizes. Therefore, after a large quantity of training images are excited a second time, the precision of the object detection model is further improved. In FIG. 4, prior results of the to-be-detected objects in the training image are classified into P types based on sizes, and the P types of prior results are respectively used for comparison by the P classifiers.

Figure 4:
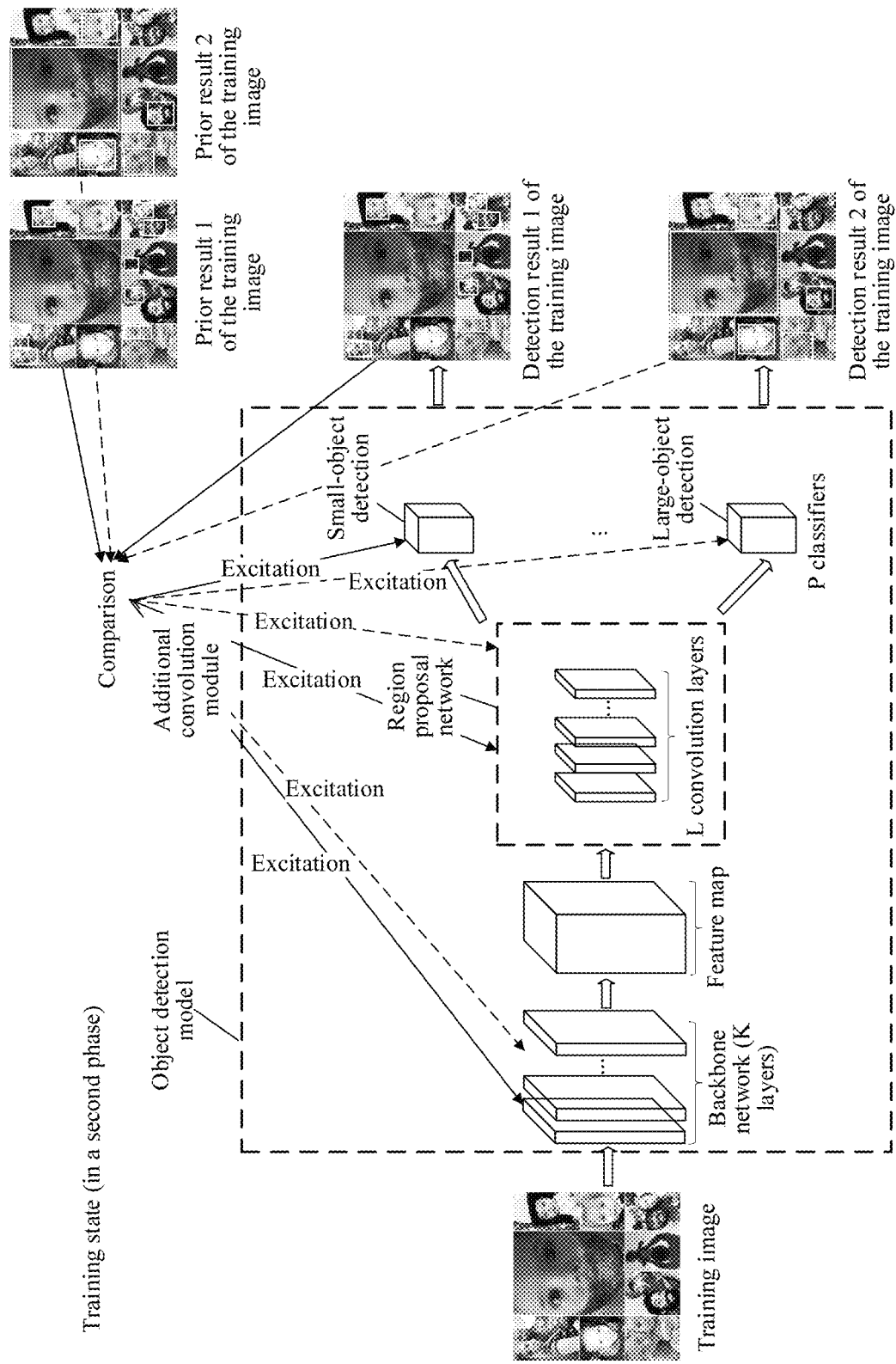
FIG. 4 is another diagram of a working procedure of a detection model training apparatus in a training state according to this application.

As shown in FIG. 4, P is equal to 2. In an embodiment, the region proposal network classifies the selected proposal regions into two proposal region sets. A proposal region in one proposal region set (corresponding to an upper classifier) has a relatively small size, and a proposal region in the other proposal region set (corresponding to a lower classifier) has a relatively large size. Therefore, a feature submap corresponding to the proposal region in the former proposal region set is used to detect a relatively small to-be-detected object in the training image, and a feature submap corresponding to the proposal region in the latter proposal region set is used to detect a relatively large to-be-detected object in the training image. The two proposal region sets each are input into a different classifier. The upper classifier is used to detect a relatively small to-be-detected object, and the lower classifier is used to detect a relatively large to-be-detected object. Detection results output by the two classifiers each are compared with a corresponding prior result. For example, a detection result 1 includes a to-be-detected object detected by the upper classifier based on the feature submap corresponding to the proposal region with the relatively small size, and a prior result 1 of the training image includes a prior result (a size, coordinates, and the like) of the to-be-detected object with a relatively small size in the training image. The detection result 1 is compared with the prior result 1, and each parameter of the object detection model is excited based on a comparison difference. The parameter includes at least one of the following the model parameter of the convolution kernel at each convolution layer of the backbone network, the model parameter of the convolution kernel of the region proposal network, the region proposal parameter of the region proposal network, or a parameter of the upper classifier. Likewise, a detection result 2 includes a to-be-detected object detected by the lower classifier based on the feature submap corresponding to the proposal region with the relatively large size, and a prior result 2 of the training image includes a prior result (a size, coordinates, and the like) of the to-be-detected object with a relatively large size in the training image. The detection result 2 is compared with the prior result 2, and each parameter of the object detection model is excited based on a comparison difference. The parameter includes at least one of the following the model parameter of the convolution kernel at each convolution layer of the backbone network, the model parameter of the convolution kernel of the region proposal network, the region proposal parameter of the region proposal network, or a parameter of the lower classifier.

It should be noted that the training images used in the first phase and the second phase may be the same or different, or may partially overlap. Different proposal region sets may be distinguished based on a preset threshold. For example, when the P proposal region sets need to be distinguished, P−1 thresholds are preset, each threshold corresponds to a size of one proposal region, and the proposal regions selected by the region proposal network are aggregated to the P proposal region sets based on the P−1 thresholds. Correspondingly, to-be-detected objects in the training image are provided with P prior results based on sizes of the to-be-detected objects in the training image, and one prior result is compared with a detection result corresponding to one size, to excite the object detection model.

The object detection model that has been trained in the second phase may be deployed in a cloud environment, an edge environment, or a terminal environment. Alternatively, a part of the object detection model may be deployed in three or any two of a cloud environment, an edge environment, and a terminal environment.

Figure 5:
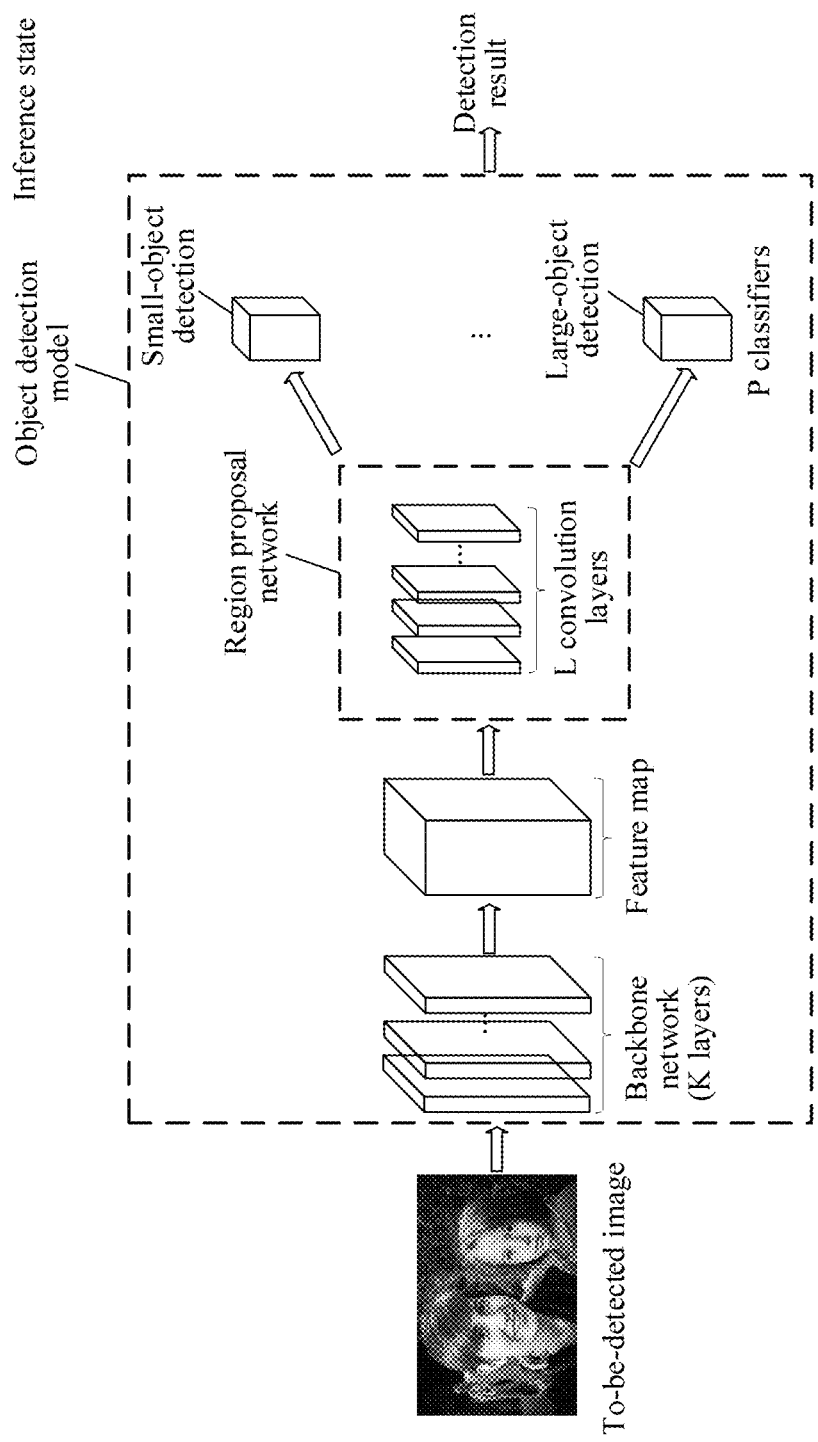
FIG. 5 is a diagram of a working procedure of an object detection model in an inference state according to this application.

As shown in FIG. 5, in an inference state, after a to-be-detected image is input into the backbone network of the object detection model, and is processed by the region proposal network and the P classifiers, the object detection model outputs a detection result of the to-be-detected image. The detection result usually includes information such as locations and a quantity of to-be-detected objects that are detected, for example, a quantity of faces and a location of each face. Similar to the training in the second phase in the training state, in the inference state, the region proposal network classifies an extracted proposal region based on a size, and sends a feature submap corresponding to each proposal region to a classifier corresponding to the proposal region. Each classifier detects to-be-detected objects with different sizes based on feature submaps corresponding to proposal regions with different sizes. A detection result of the to-be-detected image may be obtained by combining detection results of the P classifiers.

Figure 6:
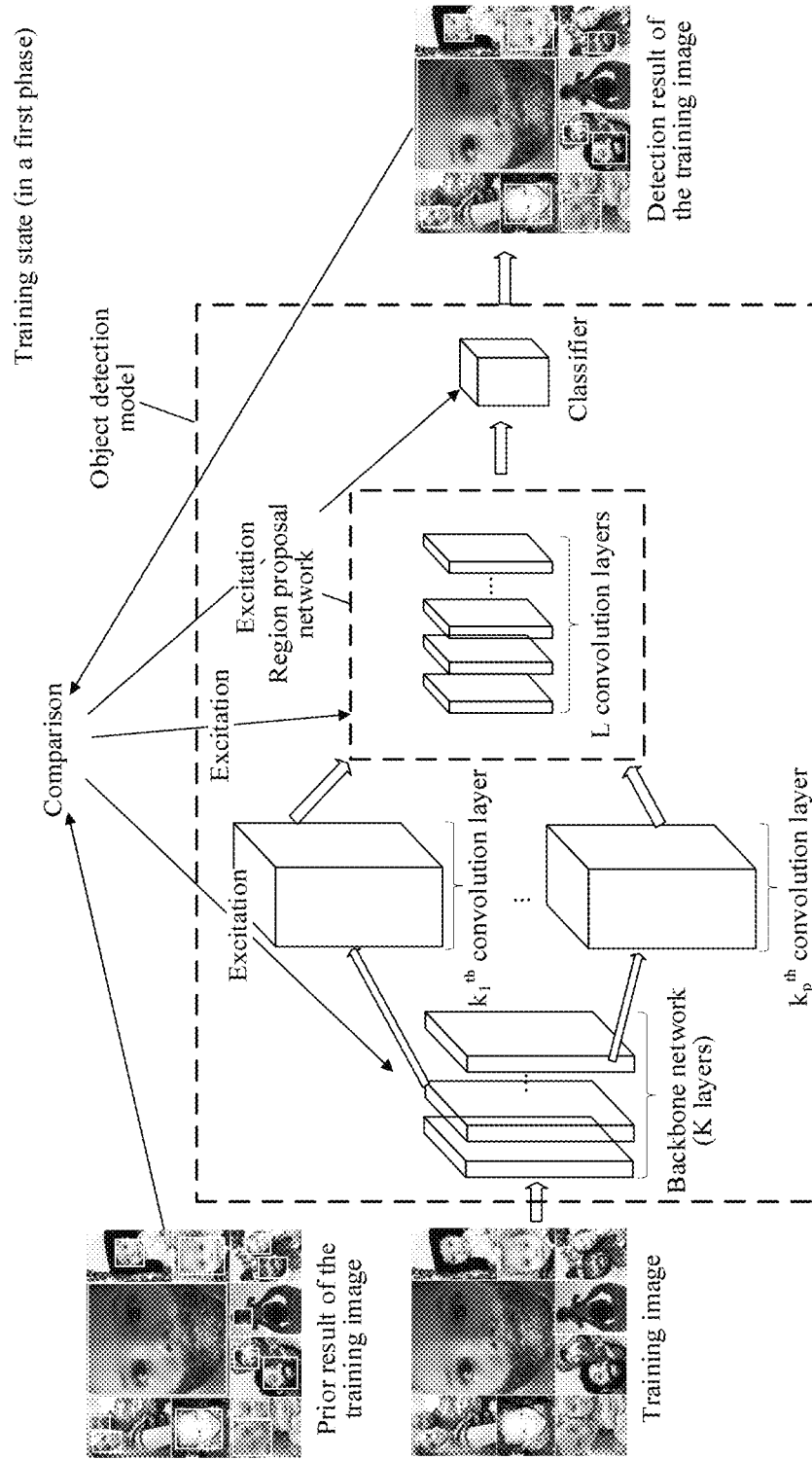
FIG. 6 is a diagram of a working procedure of a detection model training apparatus in a training state according to this application.
Figure 7:
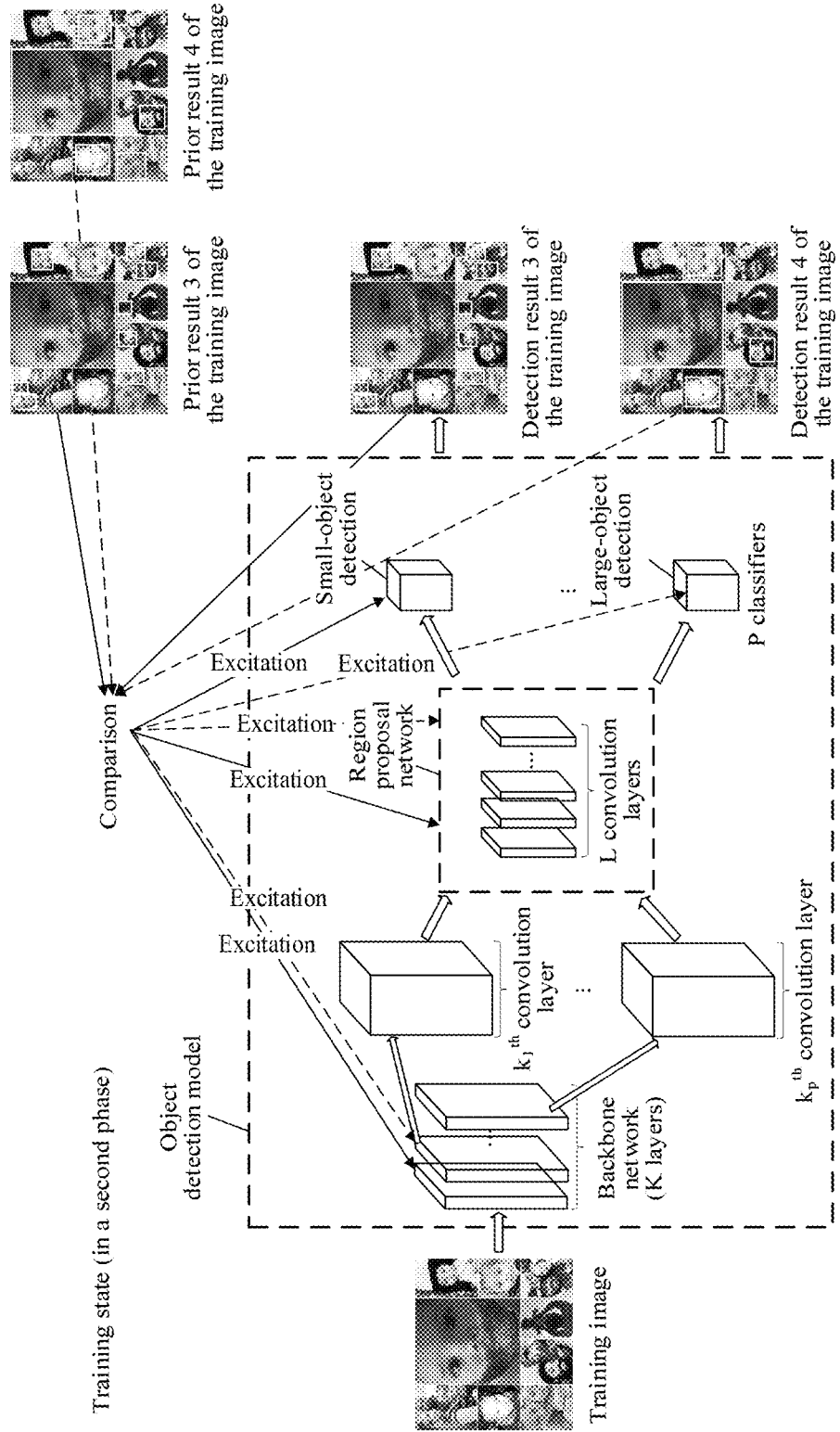
FIG. 7 is another diagram of a working procedure of a detection model training apparatus in a training state according to this application.
Figure 8:
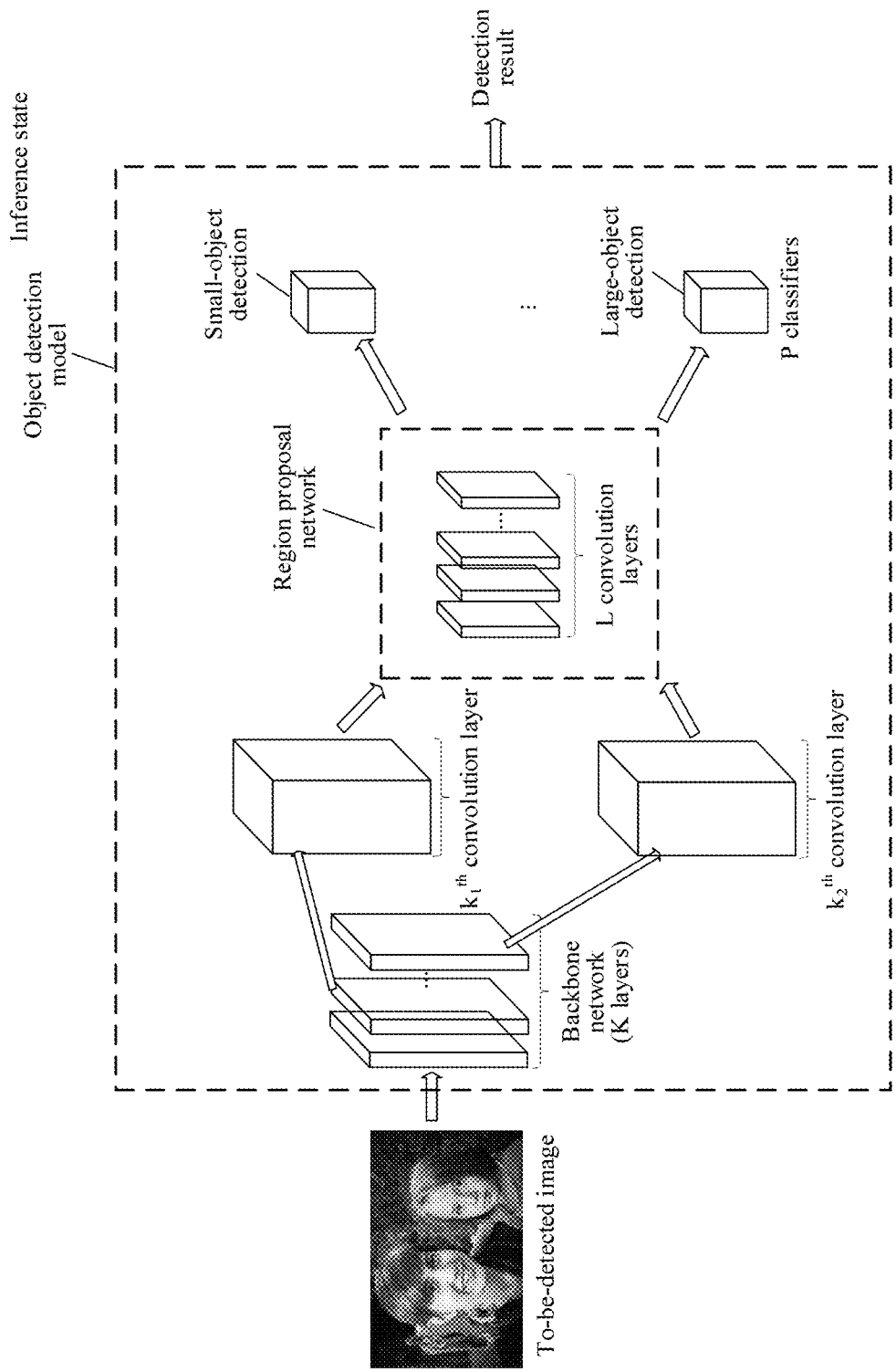
FIG. 8 is a diagram of a working procedure of training an object detection model in an inference state according to this application.

FIG. 6 to FIG. 8 show another working procedure of a check model training apparatus. Compared with the detection model training apparatus shown in FIG. 3 to FIG. 5, the detection model training apparatus shown in FIG. 6 to FIG. 8, in a training state and an interference state, uses feature maps extracted from at least two convolution layers of a backbone network, as an input to a region proposal network.

In FIG. 6, the detection model training apparatus operates in a first phase in a training state. A backbone network with K layers is established based on a training image. The backbone network includes K convolution layers, where K is a positive integer greater than 0. The backbone network extracts p feature maps from the training image. The p feature maps may be extracted from any p convolution layers of the backbone network, or may be any p convolution layers of the backbone network. The p feature maps extracted by the backbone network are input into a region proposal network. The region proposal network selects proposal regions from the p feature maps, and inputs feature submaps corresponding to the proposal regions into a classifier. Each feature submap includes some features that are included in the feature map and located in the proposal region. The classifier determines, based on a feature submap, whether a to-be-detected object is located in a region that is in the training image and that corresponds to a proposal region corresponding to the feature submap.

As shown on the right side in FIG. 6, the classifier marks a detected face region in the training image using a white box. A difference between a to-be-detected object currently detected by the detection model training apparatus and a prior result may be obtained by comparing a detection result of the training image with the prior result of the training image. As shown in FIG. 6, some faces in the prior result have not been detected by the detection model training apparatus. Each parameter of an object detection model is excited based on the difference. The parameter includes at least one of the following a model parameter of a convolution kernel at each convolution layer of the backbone network, a model parameter of a convolution kernel of the region proposal network, a region proposal parameter of the region proposal network, or a parameter of the classifier. Each parameter of the object detection model is excited based on a difference between a detection result of each training image and a prior result of the training image. Therefore, after a large quantity of training images are excited, precision of the object detection model is improved.

The detection model training apparatus trains the object detection model using a large quantity of training images and prior results of the training images. The object detection model includes the backbone network, the region proposal network, and the classifier. After the first phase in the training mode, the object detection model enters a second phase in the training mode, as shown in FIG. 7.

In the second phase in the training mode, the classifier that has undergone the first phase in FIG. 6 is first duplicated to P copies. A training image is input into the backbone network, and at least one feature map extracted by the backbone network is input into the region proposal network. The region proposal network selects proposal regions from the feature map, and aggregates the selected proposal regions to P proposal region sets based on sizes of the proposal regions. A proposal region in each proposal region set is determined based on a size of the proposal region and a stride at a convolution layer corresponding to a feature map in which the proposal region is located. Feature submaps corresponding to the proposal regions in the P proposal region sets are separately input into P classifiers. One proposal region set corresponds to one classifier, and a feature submap corresponding to a proposal region in the proposal region set is input into the classifier. Each classifier detects to-be-detected objects with different sizes based on a received feature submap, to obtain a corresponding detection result. A detection result of each classifier is compared with a prior result of a size of a to-be-detected object that is in the training image and that corresponds to a feature submap received by the classifier. Each parameter of the object detection model is excited based on a difference between a detection result of a to-be-detected object with each size and a prior result of the to-be-detected object with the size. Particularly, each classifier is trained to be more sensitive to the to-be-detected objects with different sizes. Therefore, after a large quantity of training images are excited a second time, the precision of the object detection model is further improved. In FIG. 7, prior results of the to-be-detected objects in the training image are classified into P types based on sizes, and the P types of prior results are respectively used for comparison by the P classifiers.

As shown in FIG. 7, P is equal to 2. In an embodiment, the region proposal network classifies the selected proposal regions into two proposal region sets. A product of a size of a proposal region in one proposal region set (corresponding to an upper classifier) and a stride at a convolution layer corresponding to a feature map in which the proposal region is located is relatively small, and a product of a size of a proposal region in the other proposal region set (corresponding to a lower classifier) and a stride at a convolution layer corresponding to a feature map in which the proposal region is located is relatively large. Therefore, a feature submap corresponding to the proposal region in the former proposal region set is used to detect a relatively small to-be-detected object in the training image, and a feature submap corresponding to the proposal region in the latter proposal region set is used to detect a relatively large to-be-detected object in the training image. The two proposal region sets each are input into a different classifier. The upper classifier is used to detect a relatively small to-be-detected object, and the lower classifier is used to detect a relatively large to-be-detected object. Detection results output by the two classifiers each are compared with a corresponding prior result. For example, a detection result 1 includes a to-be-detected object detected by the upper classifier based on the feature submap corresponding to the proposal region with the relatively small size, and a prior result 1 of the training image includes a prior result (a size, coordinates, and the like) of the to-be-detected object with a relatively small size in the training image. The detection result 1 is compared with the prior result 1, and each parameter of the object detection model is excited based on a comparison difference. The parameter includes at least one of the following the model parameter of the convolution kernel at each convolution layer of the backbone network, the model parameter of the convolution kernel of the region proposal network, the region proposal parameter of the region proposal network, or a parameter of the upper classifier. Likewise, a detection result 2 includes a to-be-detected object detected by the lower classifier based on the feature submap corresponding to the proposal region with the relatively large size, and a prior result 2 of the training image includes a prior result (a size, coordinates, and the like) of the to-be-detected object with a relatively large size in the training image. The detection result 2 is compared with the prior result 2, and each parameter of the object detection model is excited based on a comparison difference. The parameter includes at least one of the following the model parameter of the convolution kernel at each convolution layer of the backbone network, the model parameter of the convolution kernel of the region proposal network, the region proposal parameter of the region proposal network, or a parameter of the lower classifier.

It should be noted that the training images used in the first phase and the second phase may be the same or different, or may partially overlap. Different proposal region sets may be distinguished based on a preset threshold. For example, when the P proposal region sets need to be distinguished, P−1 thresholds are preset, each threshold corresponds to a size of one proposal region, and the proposal regions selected by the region proposal network are aggregated to the P proposal region sets based on the P−1 thresholds. Correspondingly, to-be-detected objects in the training image are provided with P prior results based on sizes of the to-be-detected objects in the training image, and one prior result is compared with a detection result corresponding to one size, to excite the object detection model.

The object detection model that has been trained in the second phase may be deployed in a cloud environment, an edge environment, or a terminal environment. Alternatively, a part of the object detection model may be deployed in three or any two of a cloud environment, an edge environment, and a terminal environment.

As shown in FIG. 8, in an inference state, after a to-be-detected image is input into the backbone network of the object detection model, and is processed by the region proposal network and the P classifiers, the object detection model outputs a detection result of the to-be-detected image. The detection result usually includes information such as locations and a quantity of to-be-detected objects that are detected, for example, a quantity of faces and a location of each face. Similar to the training in the second phase in the training state, in the inference state, the region proposal network classifies an extracted proposal region based on a size, and sends a feature submap corresponding to the proposal region to a corresponding classifier. Each classifier detects to-be-detected objects with different sizes based on feature submaps corresponding to proposal regions with different sizes. A detection result of the to-be-detected image may be obtained by combining detection results of the P classifiers.

The following describes concepts used in this application.

Backbone Network

A backbone network includes a convolutional network, and the convolutional network includes K convolution layers. The K convolution layers of the backbone network usually form a plurality of convolution blocks, and each convolution block includes a plurality of convolution layers. The backbone network usually includes five convolution blocks. In addition to the convolutional network, the backbone network may further include a pooling module. Optionally, the backbone network may use some common templates such as Vgg, Resnet, Densenet, Xception, Inception, and Mobilenet in the industry.

An extracted feature of a training image is used as a $1^{st}$ convolution layer of the backbone network. A feature extracted by a convolution kernel corresponding to the $1^{st}$ convolution layer from the $1^{st}$ convolution layer of the backbone network is used as a $2^{nd}$ convolution layer of the backbone network. A feature extracted by a convolution kernel corresponding to the $2^{nd}$ convolution layer of the backbone network from the $2^{nd}$ convolution layer of the backbone network is used as a $3^{rd}$ convolution layer of the backbone network. Likewise, a feature extracted by a convolution kernel corresponding to a $(k-1)^{th}$ convolution layer of the backbone network from the $(k-1)^{th}$ convolution layer of the backbone network is used as a $k^{th}$ convolution layer of the backbone network, where k is greater than or equal to 1 and less than or equal to K. In the detection model training apparatus corresponding to FIG. 3 to FIG. 5, a feature map extracted by a convolution kernel corresponding to a $K^{th}$ convolution layer of the backbone network from the $K^{th}$ convolution layer of the backbone network is used as an input to the region proposal network, or a $K^{th}$ convolution layer of the backbone network may be directly used as a feature map, and the feature map is used as an input to the region proposal network. In the detection model training apparatus corresponding to FIG. 6 to FIG. 8, a feature map extracted by a convolution kernel corresponding to a $k^{th}$ convolution layer of the backbone network from the $k^{th}$ convolution layer of the backbone network is used as an input to the region proposal network, or a $k^{th}$ convolution layer of the backbone network may be directly used as a feature map, and the feature map is used as an input to the region proposal network. The region proposal network includes L convolution layers, where L is an integer greater than 0. Similar to the backbone network, a feature extracted by a convolution kernel corresponding to a $(k'-1)^{th}$ convolution layer of the region proposal network from the $(k'-1)^{th}$ convolution layer of the region proposal network is used as a $k'^{th}$ convolution layer of the region proposal network, where k' is greater than or equal to 1 and less than or equal to L−1.

Convolution Layer and Convolution Kernel

Figure 9:
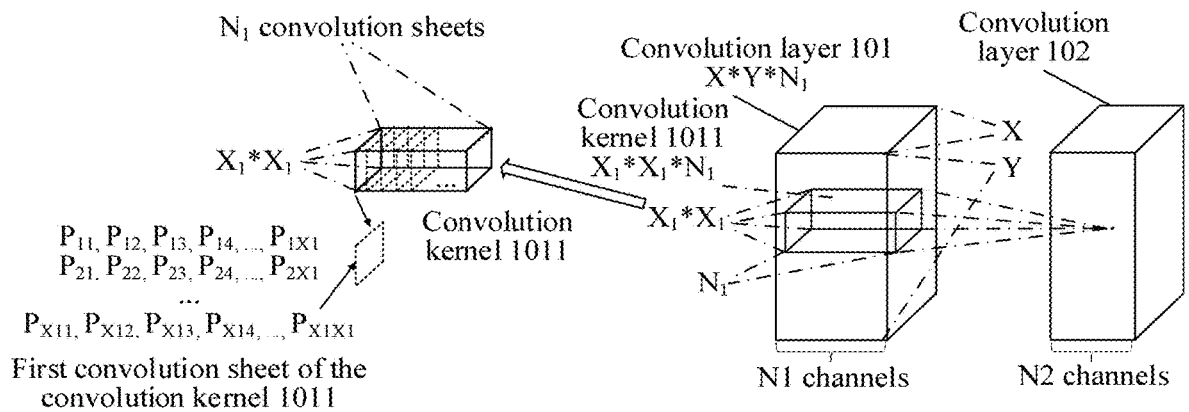
FIG. 9 is a schematic structural diagram of a convolution layer and a convolution kernel according to this application.

A backbone network and a region proposal network each include at least one convolution layer. As shown in FIG. 9, a size of a convolution layer 101 is $X*Y*N_1$. In an embodiment, the convolution layer 101 includes $X*Y*N_1$ features. $N_1$ is a quantity of channels, one channel is one feature dimension, and $X*Y$ is a quantity of features included in each channel, where X, Y, and $N_1$ are all positive integers greater than 0.

A convolution kernel 1011 is one of convolution kernels used at the convolution layer 101. A convolution layer 102 includes $N_2$ channels. Therefore, the convolution layer 101 uses a total of $N_2$ convolution kernels. Sizes and model parameters of the $N_2$ convolution kernels may be the same or different. The convolution kernel 1011 is used as an example, and a size of the convolution kernel 1011 is $X_1*X_1*N_1$. In an embodiment, the convolution kernel 1011 includes $X_1*X_1*N_1$ model parameters. A common model parameter template in the industry may be used as an initialization model parameter of the convolution kernel. When the convolution kernel 1011 slides at the convolution layer 101 and slides to a location at the convolution layer 101, a model parameter of the convolution kernel 1011 is multiplied by a feature at the corresponding location at the convolution layer 101. After product results of all the model parameters of the convolution kernel 1011 and features at corresponding locations at the convolution layer 101 are combined, one feature of a channel of the convolution layer 102 is obtained. A product result of a feature of the convolution layer 101 and the convolution kernel 1011 may be directly used as a feature of the convolution layer 102. Alternatively, after sliding of the convolution kernel 1011 is completed at the convolution layer 101, and all product results are output, all the product results may be normalized, and a normalized product result is used as a feature of the convolution layer 102.

It is vividly expressed that the convolution kernel 1011 performs convolution at the convolution layer 101 in a sliding manner, and a convolution result is used as a channel of the convolution layer 102. Each convolution kernel used at the convolution layer 101 corresponds to one channel of the convolution layer 102. Therefore, a quantity of channels of the convolution kernel 102 is equal to a quantity of convolution kernels used at the convolution layer 101. A model parameter of each convolution kernel is designed to reflect a characteristic of a feature that the convolution kernel expects to extract from a convolution layer. Features of $N_2$ channels are extracted from the convolution layer 101 using $N_2$ convolution kernels.

As shown in FIG. 9, the convolution kernel 1011 is split. The convolution kernel 1011 includes $N_1$ convolution sheets, and each convolution sheet includes $X_1*X_1$ model parameters (from $P_{11}$ to $Px_1x_1$). Each model parameter corresponds to one convolution point. A model parameter corresponding to one convolution point is multiplied by a feature at a location that corresponds to the convolution point and that is located at a convolution layer, to obtain a convolution result of the convolution point. A sum of convolution results of convolution points of one convolution kernel is a convolution result of the convolution kernel.

Convolution Kernel Sliding Stride

A convolution kernel sliding stride is a quantity of features by which a convolution kernel strides at a convolution layer during each sliding. After the convolution kernel completes convolution at a current location at a current convolution layer, and a feature of a next convolution layer is obtained, the convolution kernel slides by V features based on the current location at the current convolution layer, and performs, at a location after the sliding, convolution on a model parameter of the convolution kernel and a feature of the convolution layer. V is a convolution kernel sliding stride.

Receptive Field

Figure 10:
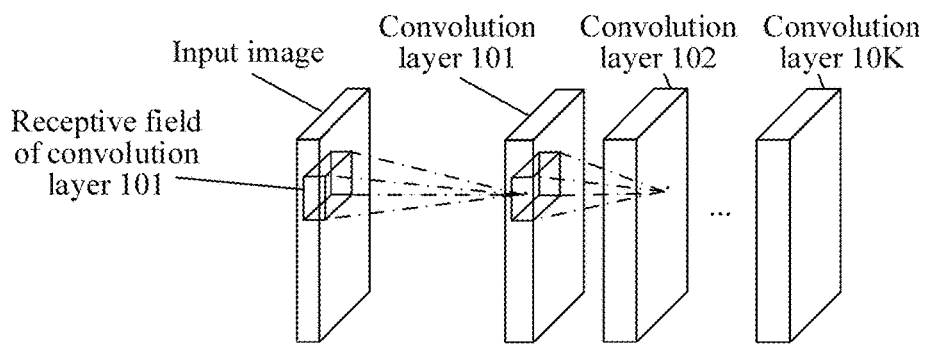
FIG. 10 is a schematic diagram of a receptive field of a convolution layer according to this application.

A receptive field is a perception domain (a perception range), on an input image, of a feature at a convolution layer, and a value of the feature varies with a pixel in the perception range. As shown in FIG. 10, a convolution kernel slides on an input image, and an extracted feature forms a convolution layer 101. Likewise, the convolution kernel slides at the convolution layer 101, and an extracted feature forms a convolution layer 102. In this case, each feature of the convolution layer 101 is extracted based on a pixel that is of the input image and that is within a size range of a convolution sheet of the convolution kernel that slides on the input image. The size is a receptive field of the convolution layer 101. The receptive field of the convolution layer 101 is shown in FIG. 10.

Figure 11:
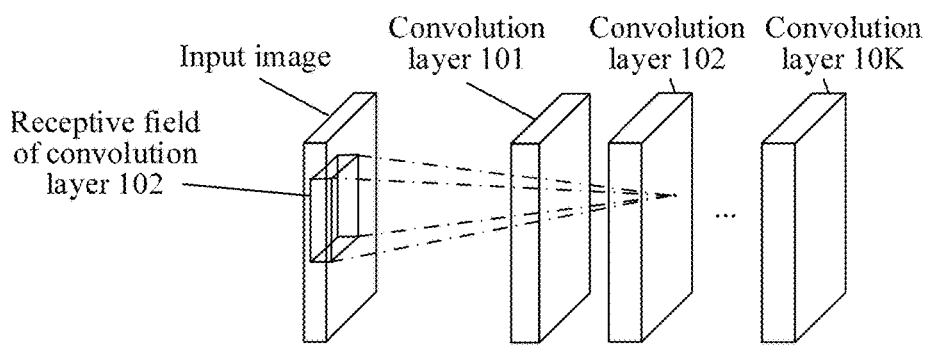
FIG. 11 is a schematic diagram of a receptive field of another convolution layer according to this application.

Correspondingly, a range obtained by mapping each feature of the convolution layer 102 onto the input image (namely, a pixel within a specific range on the input image) is a receptive field of the convolution layer 102. As shown in FIG. 11, each feature of the convolution layer 102 is extracted based on a pixel that is of the input image and that is within a size of a convolution sheet of a convolution kernel that slides at the convolution layer 101. Each feature of the convolution layer 101 is extracted based on a pixel that is of the input image and that is within a range of the convolution sheet of the convolution kernel that slides on the input image. Therefore, the receptive field of the convolution layer 102 is larger than the receptive field of the convolution layer 101. If a backbone network includes a plurality of convolution layers, a receptive field of a last convolution layer in the plurality of convolution layers is a receptive field of the backbone network.

Training Computing Capability

A training computing capability is a computing capability that can be used by a detection model training apparatus in a deployment environment of the detection model training apparatus, including at least one of the following a frequency of a processor, processor usage, a memory size, memory usage, buffer usage, a buffer size, a frequency of an image processor, usage of the image processor, or another parameter of a computing resource. When parts of the detection model training apparatus are deployed in a plurality of environments, the training computing capability may be obtained by comprehensively calculating computing capabilities that can be used by the detection model training apparatus in the plurality of environments.

Classifier

A classifier includes functions including a series of parameters. The classifier detects information such as locations and a quantity of to-be-detected objects in a to-be-detected image based on an input feature and these functions. Common classifiers include a softmax classifier, a sigmoid classifier, and the like.

Stride

Generally, a size of a $(k+1)^{th}$ convolution layer of a backbone network is less than or equal to a size of a $k^{th}$ convolution layer of the backbone network, and a stride at the $k^{th}$ convolution layer of the backbone network is a ratio of a size of an image input into the backbone network to the size of the $k^{th}$ convolution layer. The image input into the backbone network may be a training image or a to-be-detected image. The stride at the $k^{th}$ convolution layer of the backbone network is usually related to a quantity of pooling layers from a $1^{st}$ convolution layer to the $k^{th}$ convolution layer of the backbone network and a convolution kernel sliding stride at a convolution layer from the $1^{st}$ convolution layer to the $k^{th}$ convolution layer of the backbone network. A larger quantity of pooling layers from the $1^{st}$ convolution layer to the $k^{th}$ convolution layer indicates a larger convolution kernel sliding stride used by the convolution layer from the $1^{st}$ convolution layer to the $k^{th}$ convolution layer and a larger stride at the $k^{th}$ convolution layer.

Figure 12:
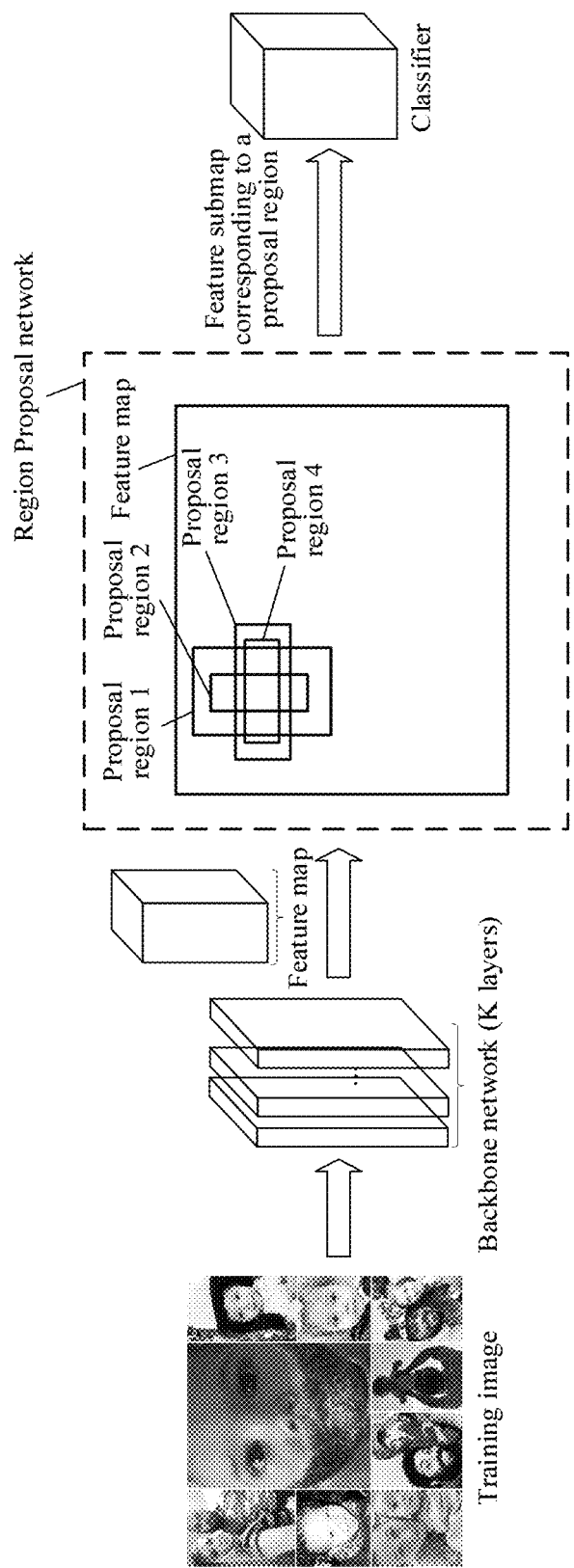
FIG. 12 is a diagram of a working procedure of a region proposal network according to this application.

Region proposal network, region proposal parameter, proposal region, and proposal region set As shown in FIG. 12, a region proposal network determines a plurality of proposal regions from a feature map based on a region proposal parameter. The region proposal parameter may include a length and a width of a proposal region. Different proposal regions usually have different sizes.

In the object detection models corresponding to FIG. 3 and FIG. 6, the region proposal network first obtains a plurality of proposal regions based on the region proposal parameter, calculates a confidence level of each of the plurality of proposal regions based on a convolution kernel corresponding to L convolution layers, namely, a possibility that a region corresponding to each proposal region in the training image includes a to-be-detected object, selects feature submaps corresponding to a particular quantity of proposal regions whose confidence levels are greater than a particular threshold or whose confidence levels are the highest, and inputs the feature submaps into the classifier.

In the object detection models corresponding to FIG. 4 and FIG. 5, after obtaining a plurality of proposal regions, for example, proposal regions 1 to 4, the region proposal network may aggregate the plurality of proposal regions to P proposal region sets based on sizes of the proposal regions (a quantity of features included in the proposal regions). Then, the region proposal network inputs, into one classifier, a feature submap corresponding to a proposal region in one proposal region set. A size of a proposal region is related to a size of a to-be-detected object. Therefore, the proposal regions are aggregated to the proposal region sets based on the sizes of the proposal regions, and proposal regions in different proposal region sets are detected by different classifiers and excited based on detection results. In this way, different classifiers are more sensitive to the to-be-detected objects with different sizes.

In the object detection models corresponding to FIG. 7 and FIG. 8, different convolution layers of the backbone network are used as the feature maps and the feature maps are input into the region proposal network, and different convolution layers may have different strides. Therefore, to-be-detected objects in the training image that correspond to proposal regions with a same size at the convolution layers with the different strides have different sizes. When sizes of the proposal regions are the same, a proposal region at a convolution layer with a larger stride indicates a to-be-detected object with a larger size, and a proposal region at a convolution layer with a smaller stride indicates a to-be-detected object with a smaller size. Therefore, in the object detection models corresponding to FIG. 6 to FIG. 8, after obtaining proposal regions from different feature maps, the region proposal network comprehensively considers a size of each proposal region and a stride at a convolution layer corresponding to a feature map in which the proposal region is located, and then aggregates the proposal regions obtained from the different feature maps, to P proposal region sets based on the size of each proposal region and the stride at the convolution layer corresponding to the feature map in which the proposal region is located. Then, the region proposal network inputs, into one classifier, a feature submap corresponding to a proposal region in one proposal region set. Commonly, the region proposal network uses a product of the size of each proposal region and the stride at the convolution layer corresponding to the feature map in which the proposal region is located, as an aggregation criterion. For example, after obtaining T proposal regions from the different feature maps, the region proposal network obtains a product of a size of each proposal region and a stride at a convolution layer corresponding to a feature map in which the proposal region is located. The region proposal network aggregates the T proposal regions to P proposal region sets based on the T products. For example, each of the T products may be compared with a preset (P−1) threshold, to determine a specific proposal region set into which a proposal region corresponding to each product is classified.

FIG. 13A and FIG. 13B and FIG. 14A and FIG. 14B separately show the working procedures of the detection model training apparatuses corresponding to FIG. 3 to FIG. 5 and FIG. 6 to FIG. 8.

Figure 13A:
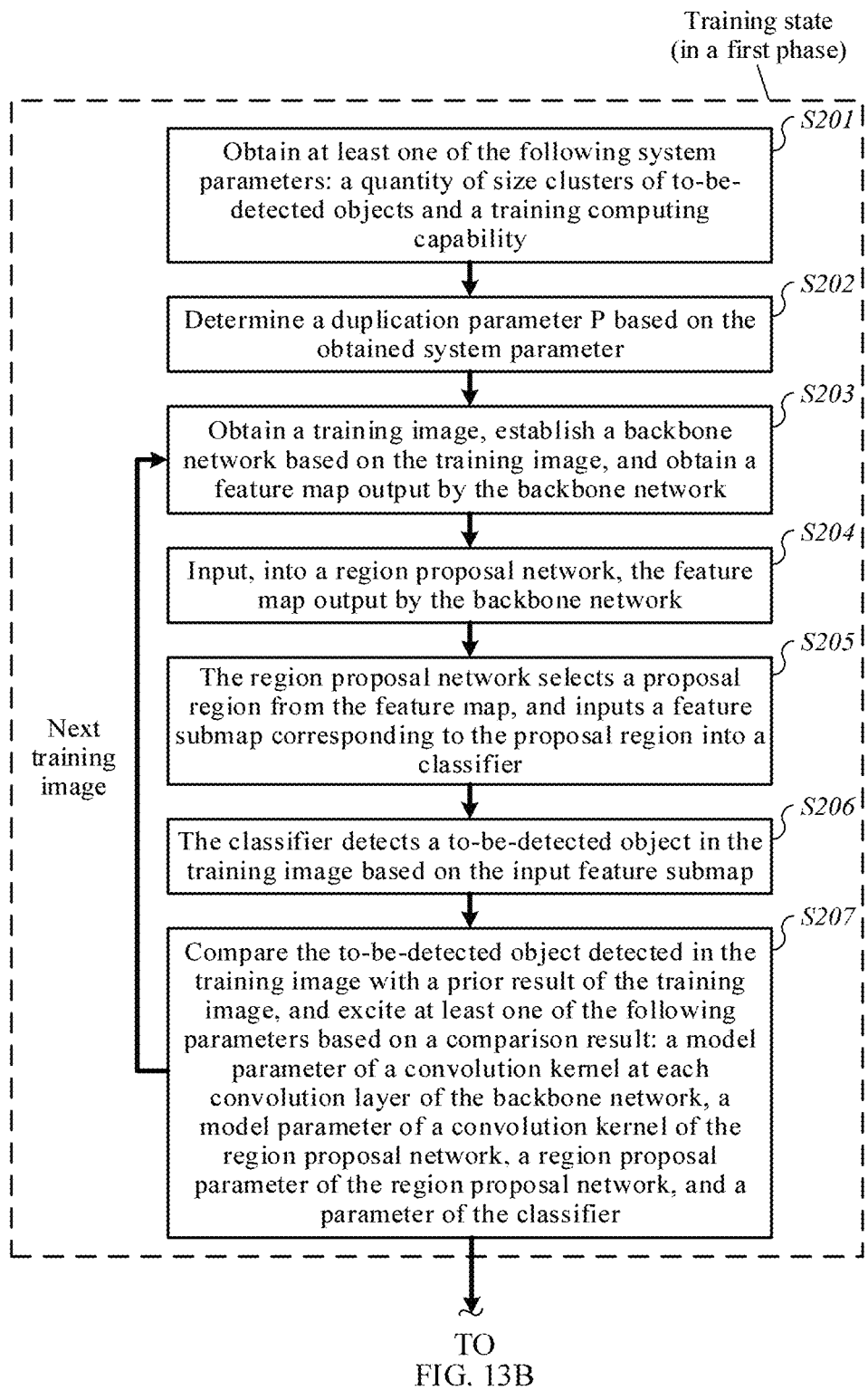
FIG. 13A and FIG. 13B are a schematic flowchart of a method according to this application.
Figure 13B:
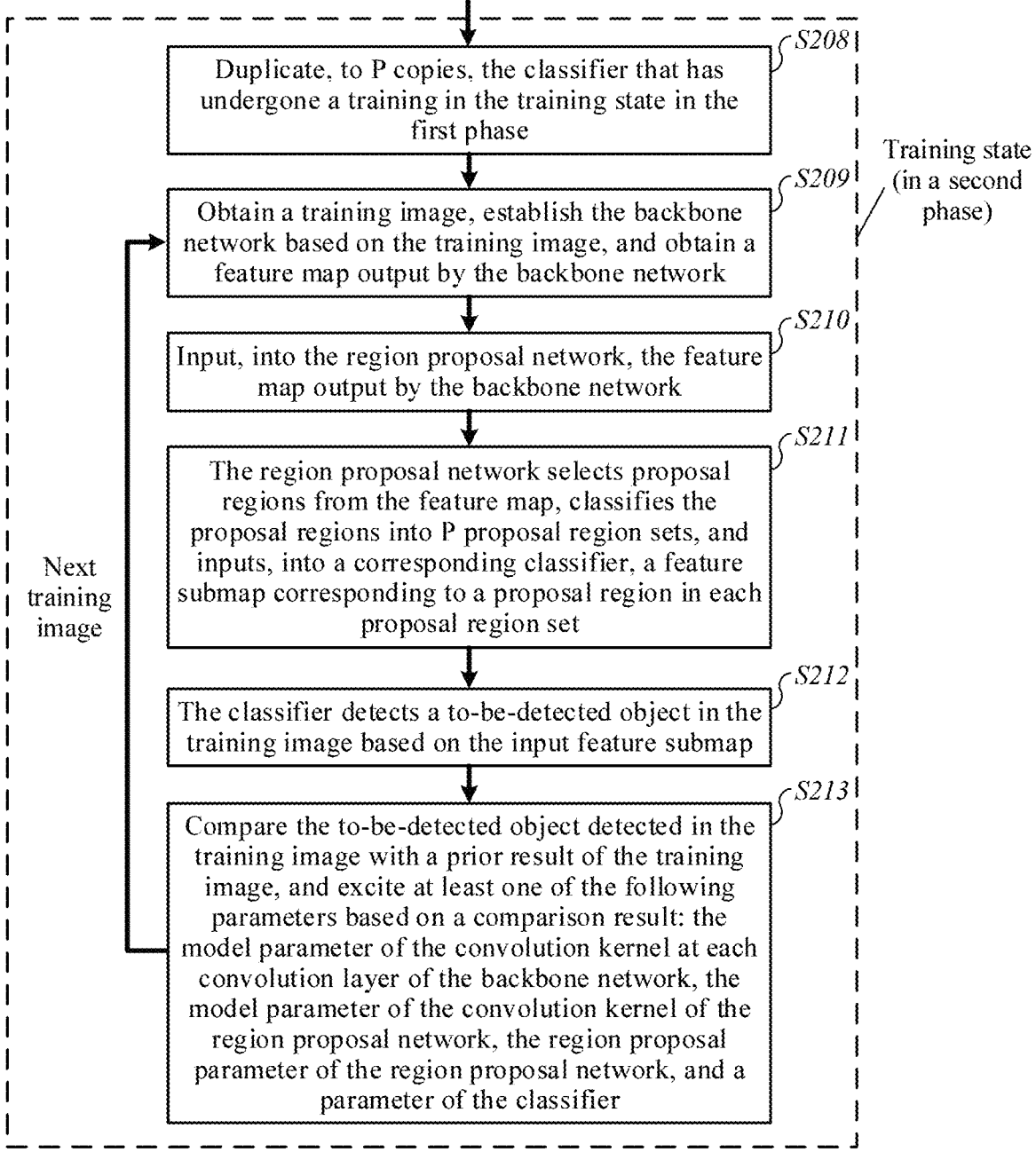

As shown in FIG. 13A and FIG. 13B, a working procedure of a detection model training apparatus is described.

S201. Obtain at least one of the following system parameters a quantity of size clusters of to-be-detected objects or a training computing capability.

The quantity of size clusters of the to-be-detected objects is a quantity of sets that can be obtained by performing clustering on sizes of the to-be-detected objects. For example, when the quantity of size clusters of the to-be-detected objects is 2, the sizes of the to-be-detected objects may be classified into two sets.

A quantity of size clusters of to-be-detected objects may be obtained based on a quantity of clusters that is obtained by performing clustering on sizes of the to-be-detected objects in a training image using a clustering algorithm. The clustering algorithm may be a K-means clustering algorithm or the like. Alternatively, the quantity of size clusters of the to-be-detected objects and complexity of the to-be-detected objects may be manually input into the detection model training apparatus.

The system parameter means a parameter of the training image, a parameter of a to-be-detected object in the training image, a parameter of a backbone network, or a parameter of a training environment. Such a system parameter may be obtained before an object detection model is established. The system parameter is also referred to as a super parameter, and different system parameters may cause different duplication parameters. A model parameter means a parameter corresponding to each convolution point of a convolution kernel, and the model parameter varies depending on continuous excitation in a training process of the object detection model.

The system parameter may be obtained in a plurality of times, and does not need to be obtained in a same step. All of the foregoing system parameters are not necessarily obtained. A specific system parameter to be obtained is determined depending on a system parameter required for determining a duplication parameter in a subsequent step. Each system parameter may be obtained before a subsequent step in which the system parameter is to be used.

S202. Determine a duplication parameter P based on the system parameter obtained in S201.

The duplication parameter P is determined based on the system parameter obtained in S201. Specifically, a function P=f (system parameter) for calculating the duplication parameter P may be preset, and an independent variable of a function f is the system parameter obtained in S201.

S202 may be performed at any time after S201 and before S208.

S203. Obtain a training image, establish a backbone network based on the training image, and obtain a feature map output by the backbone network.

S204. Input, into a region proposal network, the feature map output by the backbone network.

The feature map output by the backbone network in S204 is a feature of a $K^{th}$ convolution layer of the backbone network or a feature extracted by a convolution kernel from a $K^{th}$ convolution layer.

S205. The region proposal network selects a proposal region from the feature map, and inputs a feature submap corresponding to the proposal region into a classifier.

S206. The classifier detects a to-be-detected object in the training image based on the feature submap input in S205.

A parameter is set in the classifier. The classifier detects the to-be-detected object in the training image based on the parameter and an input feature.

S207. Compare the detection result, detected in S206, in the training image with a prior result of the training image, and excite at least one of the following parameters based on a comparison result a model parameter of a convolution kernel at each convolution layer of the backbone network, a model parameter of a convolution kernel of the region proposal network, a region proposal parameter of the region proposal network, or a parameter of the classifier.

After S207, exciting the object detection model based on the training image obtained in S203 is completed, and the detection model training apparatus obtains a next training image, and trains the object detection model based on the next training image and a prior result of the next training image.

An excitation process of the next training image is similar to an excitation process of the training image obtained in S203. Main differences lie in 1. The model parameter that is of the convolution kernel at each convolution layer of the backbone network and that is used when the backbone network extracts a feature map from the next training image has been excited in S207 (if the model parameter has been excited in S207). 2. After the feature map is extracted by the backbone network from the next training image, the model parameter of the convolution kernel of the region proposal network into which the feature map is input and the region proposal parameter of the region proposal network have been excited in S207 (if the model parameter and the region proposal parameter have been excited in S207). 3. A feature of the classifier that processes the next training image has been excited in S207 (if the feature has been excited in S207).

Likewise, each training image is used for further excitation based on excitation performed on the object detection model using a previous training image. After all training images are sequentially used for training the object detection model, a first phase in a training state of the object detection model is completed.

S208. Duplicate, to P copies, the classifier that has undergone the training in the first phase in the training state.

S209. Obtain a training image, establish the backbone network based on the training image, and obtain a feature map output by the backbone network.

S210. Input, into the region proposal network, the feature map output by the backbone network.

S211. The region proposal network selects a plurality of proposal regions from the feature map, classifies the selected plurality of proposal regions into P proposal region sets, and inputs, into a corresponding classifier, a feature submap corresponding to a proposal region in each proposal region set.

S212. The classifier detects a to-be-detected object in the training image based on the feature submap input in S211.

S213. Compare the detection result, detected in S212, in the training image with a prior result of the training image, and excite at least one of the following parameters based on a comparison result the model parameter of the convolution kernel at each convolution layer of the backbone network, the model parameter of the convolution kernel of the region proposal network, the region proposal parameter of the region proposal network, or a parameter of the classifier.

In S212 and S213, each classifier detects a to-be-detected object in the training image based on a feature submap obtained by the classifier, and the classifier is excited based on a result of comparison between a detection result and the prior result. Each classifier obtained through duplication in S208 performs S212 and S213.

An excitation process of a next training image is similar to an excitation process of the training image obtained in S209. Main differences lie in 1. The model parameter that is of the convolution kernel at each convolution layer of the backbone network and that is used when the backbone network extracts a feature map from the next training image has been excited in S213 (if the model parameter has been excited in S213). 2. After the feature map is extracted by the backbone network from the next training image, the model parameter of the convolution kernel of the region proposal network into which the feature map is input and the region proposal parameter of the region proposal network have been excited in S213 (if the model parameter and the region proposal parameter have been excited in S213). 3. A feature of the classifier that processes the next training image has been excited in S213 (if the feature has been excited in S213).

Likewise, each training image is used for further excitation based on excitation performed on the object detection model using a previous training image. After all training images are sequentially used for the object detection model in a second phase in the training state, a training process of the object detection model ends. As shown in FIG. 5, the object detection model may be used in the inference state.

Figure 14A:
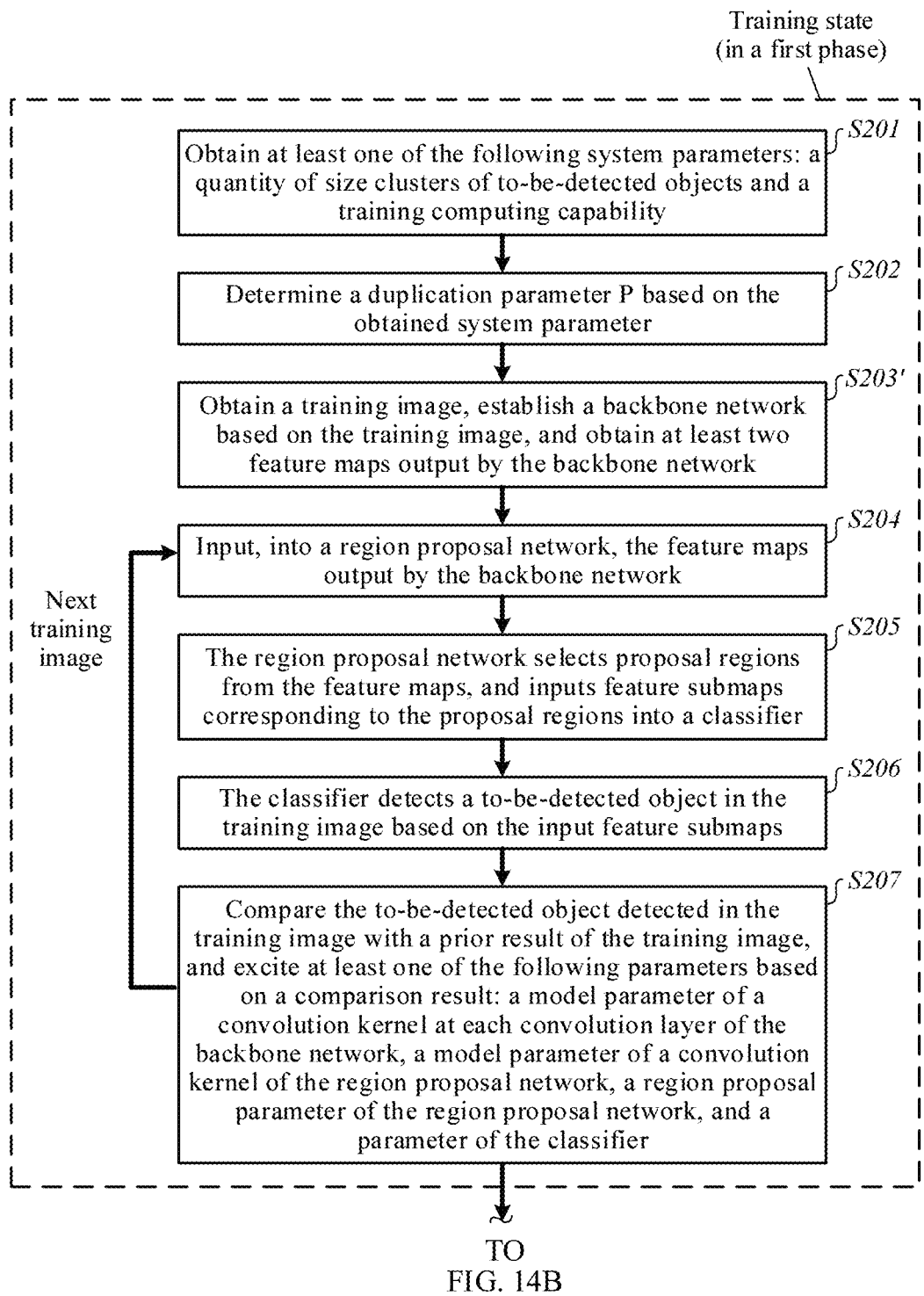
FIG. 14A and FIG. 14B is a schematic flowchart of another method according to this application.
Figure 14B:
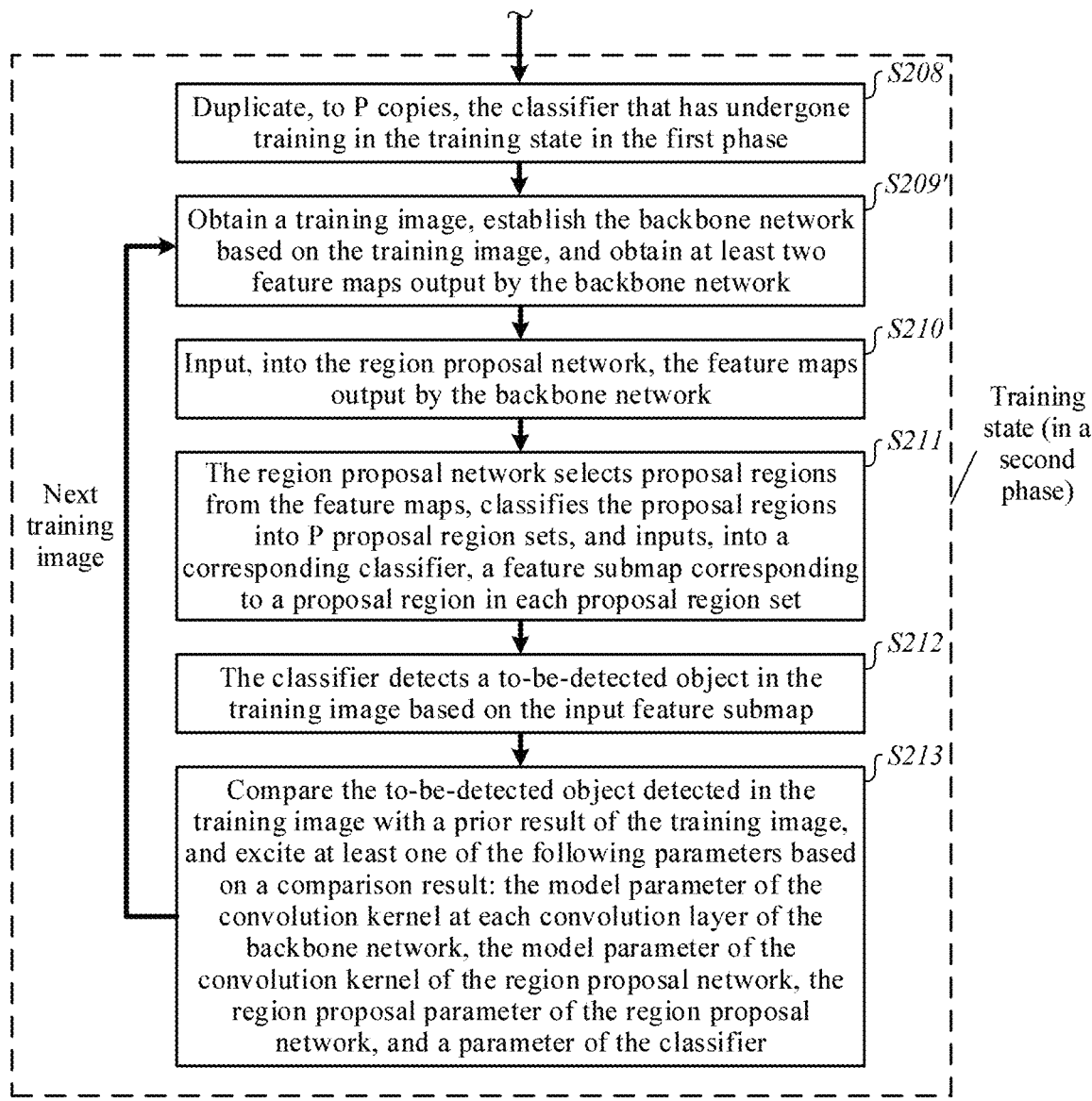

As shown in FIG. 14A and FIG. 14B, another working procedure of a detection model training apparatus is described. A main difference between the working procedure and the working procedure shown in FIG. 13A and FIG. 13B lies in that S203 and S209 in the working procedure shown in FIG. 13A and FIG. 13B are respectively replaced with S203' and S209'.

With reference to corresponding parts in FIG. 6 to FIG. 8, in S203' and S209', a backbone network extracts at least two feature maps and inputs the at least two feature maps into a region proposal network such that the region proposal network selects proposal regions. After all training images are sequentially used for an object detection model in a training state in a second phase, a training process of the object detection model ends. As shown in FIG. 8, the object detection model may be used in the inference state.

Figure 15:
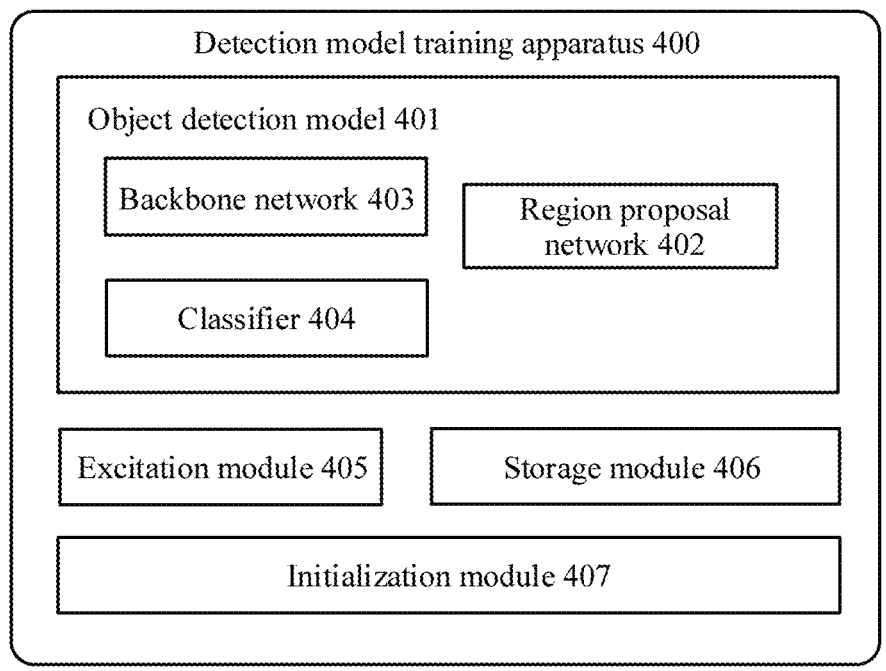
FIG. 15 is a schematic structural diagram of a detection model training apparatus according to this application.

This application further provides a detection model training apparatus 400. As shown in FIG. 15, the detection model training apparatus 400 includes an object detection model 401, an excitation module 405, a storage module 406, and an initialization module 407. The object detection model 401 further includes a backbone network 403, a classifier 404, and a region proposal network 402. The classifier 404 includes one classifier in a first phase in a training state, and includes P classifiers in an inference state and in a second phase in the training state.

The foregoing modules may be software modules. In the first phase in the training state, the initialization module 407 is configured to perform S201 and S202, to determine a duplication parameter P. The object detection model 401 obtains a training image from the storage module 406, and performs S203 or S203' and S204, to establish the backbone network 403. The region proposal network 402 performs S205. The classifier 404 is configured to perform S206. The excitation module 405 is configured to perform S207. In the second phase in the training state, the initialization module 407 is configured to perform S208, and the object detection model 401 obtains a training image from the storage module 406, and performs S209 or S209' and S210, to establish the backbone network 403. The region proposal network 402 performs S211. The classifier 404 is configured to perform S212. The excitation module 405 is configured to perform S213.

The detection model training apparatus 400 may be used as an object detection model training service to be provided for a user. For example, as shown in FIG. 1, the detection model training apparatus 400 (or a part of the detection model training apparatus 400) is deployed in a cloud environment, and after selecting a backbone network type and some system parameters, and placing a training image and a prior result of the training image into the storage module 406, a user starts the detection model training apparatus 400 to train the object detection model 401. The object detection model 401 that has been trained is provided for the user, and the user can run the object detection model 401 in a terminal environment of the user or directly sell the object detection model 401 to a third party for use.

Figure 16:
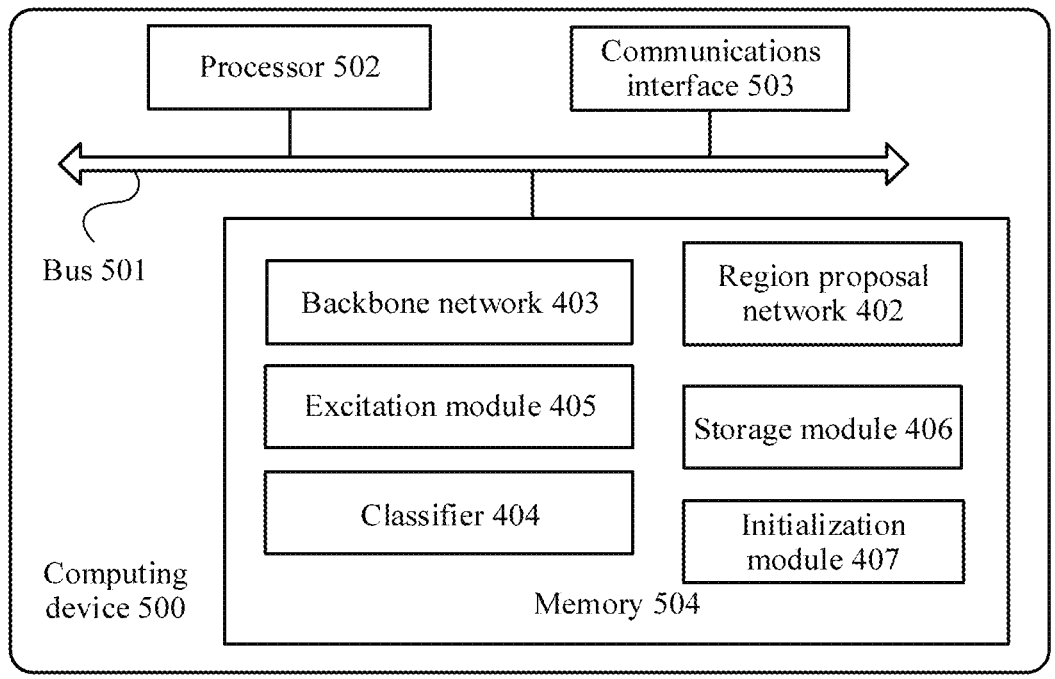
FIG. 16 is a schematic structural diagram of a computing device according to this application.

This application further provides a computing device 500. As shown in FIG. 16, the computing device 500 includes a bus 501, a processor 502, a communications interface 503, and a memory 504. The processor 502, the memory 504, and the communications interface 503 communicate with each other using the bus 501.

The processor may be a central processing unit (CPU). The memory may include a volatile memory, for example, a RAM. The memory may further include a non-volatile memory, for example, a read-only memory (ROM), a flash memory, an HDD, or an SSD. The memory stores executable code, and the processor executes the executable code to perform the foregoing object detection model training method. The memory may further include another software module, such as an operating system, required for running a process. The operating system may be LINUX™, UNIX™, WINDOWS™, or the like.

The memory of the computing device 500 stores code corresponding to all the modules in the detection model training apparatus 400. The processor 502 executes the code to implement functions of all the modules in the detection model training apparatus 400, that is, perform the method shown in FIG. 13A and FIG. 13B or FIG. 14A and FIG. 14B. The computing device 500 may be a computing device in a cloud environment, in an edge environment, or in a terminal environment.

Figure 17:
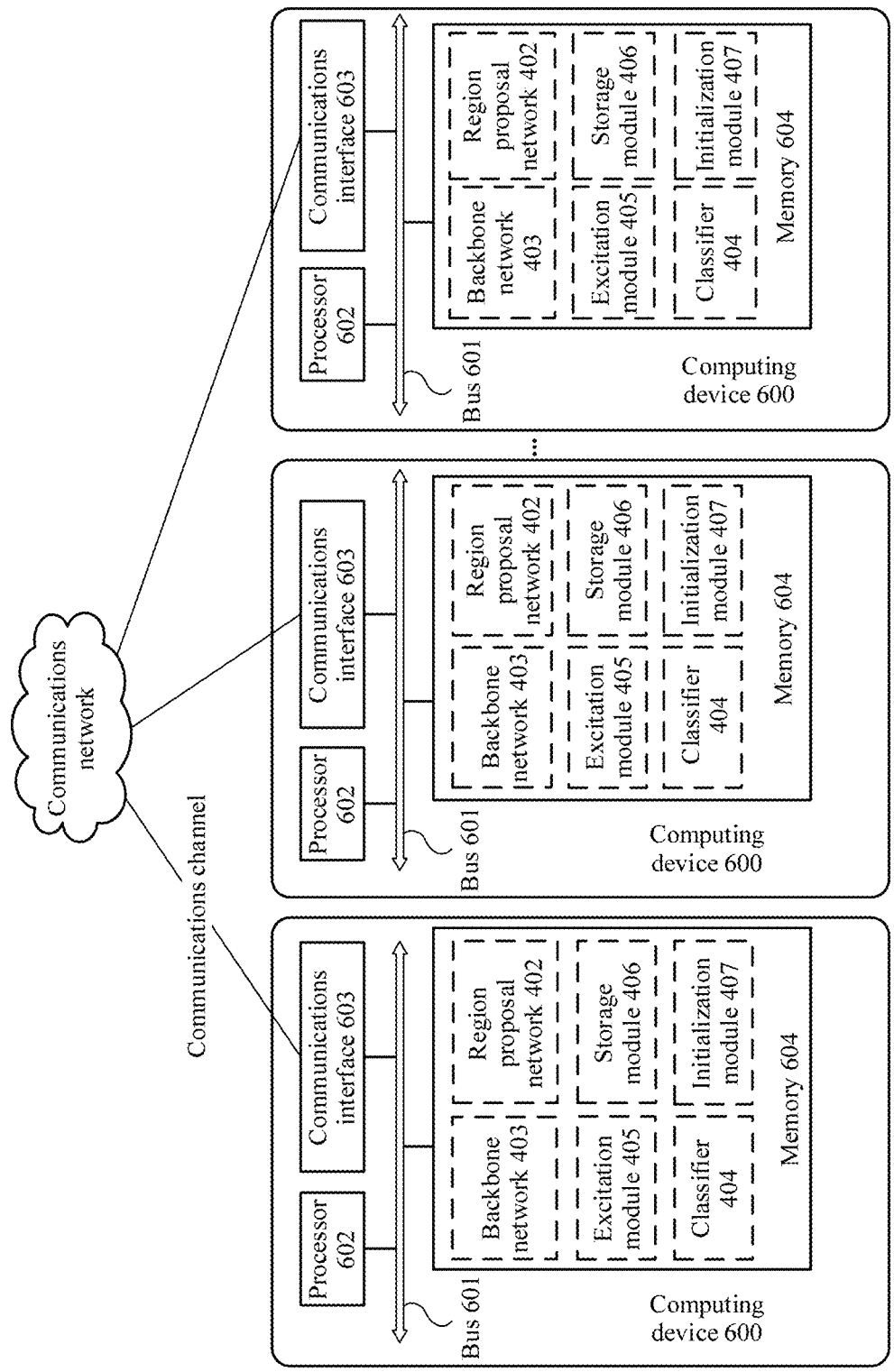
FIG. 17 is a schematic structural diagram of a computing device system according to this application.

As shown in FIG. 2, all parts of the detection model training apparatus 400 may be executed on a plurality of computing devices in different environments. Therefore, this application further proposes a computing device system. As shown in FIG. 17, the computing device system includes a plurality of computing devices 600. Each computing device 600 has a same structure as the computing device 500 in FIG. 16. A communications channel is established between the computing devices 600 using a communications network. Any one or more of a region proposal network 402, a backbone network 403, a classifier 404, an excitation module 405, a storage module 406, and an initialization module 407 are run on each computing device 600. Any computing device 600 may be a computing device in a cloud environment, in an edge environment, or in a terminal environment.

Figure 18:
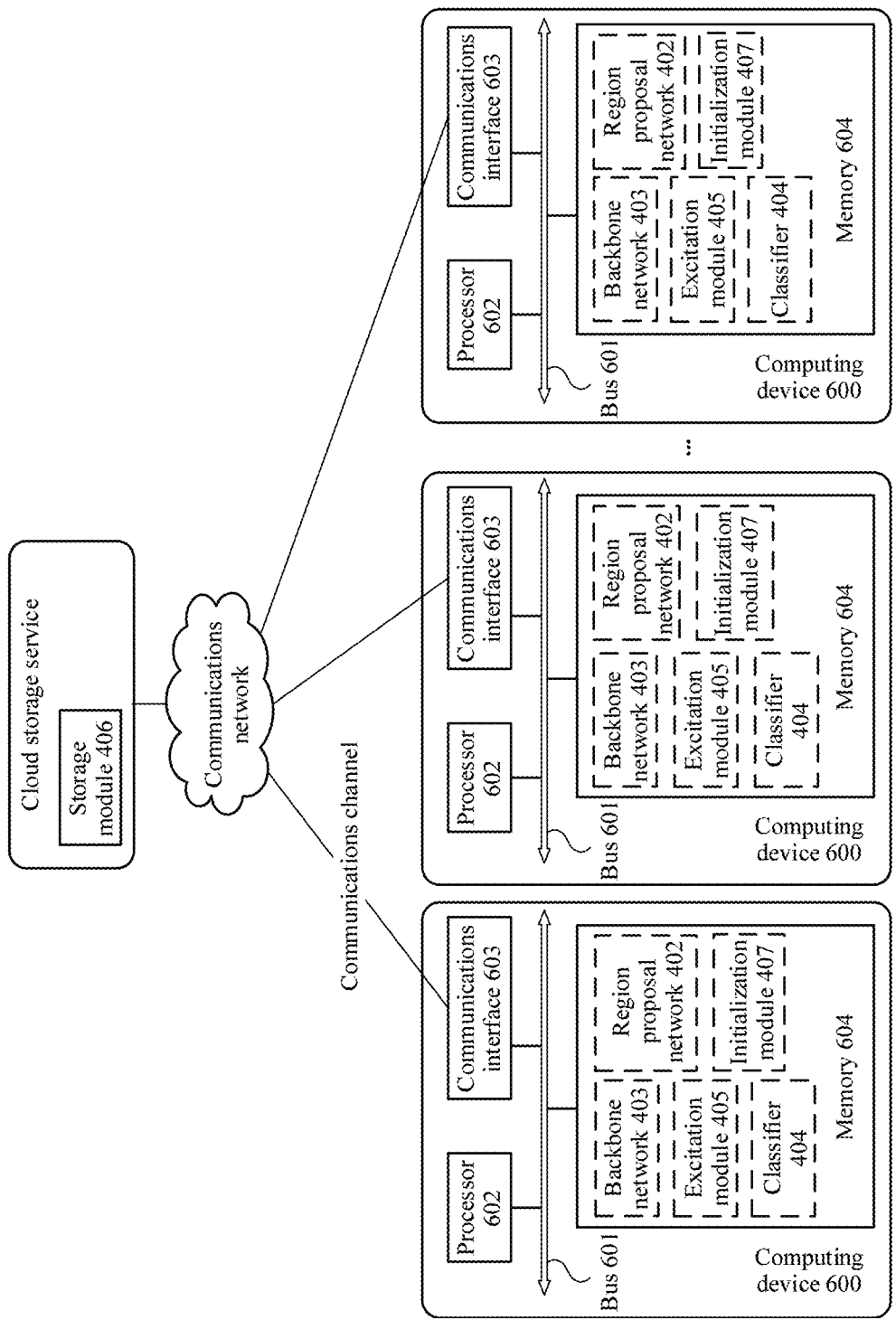
FIG. 18 is a schematic structural diagram of another computing device system according to this application.

Further, as shown in FIG. 18, a training image and a prior result of the training image occupy much space, and therefore a computing device 600 may be unable to store all training images and prior results of the training images. This application further proposes a computing device system. A storage module 406 is deployed in a cloud storage service (for example, an object storage service). A user applies for storage space with a particular capacity in the cloud storage service, uses the storage space as the storage module 406, and stores a training image and a prior result of the training image in the storage module 406. When a computing device 600 runs, a required training image and a prior result of the training image are obtained from the remote storage module 406 using a communications network. Any one or more of a region proposal network 402, a backbone network 403, a classifier 404, an excitation module 405, and an initialization module 407 are run on each computing device 600. Any computing device 600 may be a computing device in a cloud environment, in an edge environment, or in a terminal environment.

A description of a procedure corresponding to each of the accompanying drawings has a focus. For a part that is not described in detail in a procedure, refer to a related description of another procedure.

All or some of the foregoing embodiments may be implemented using software, hardware, firmware, or any combination thereof. When software is used to implement the embodiments, all or some of the embodiments may be implemented in a form of a computing device program product. The computing device program product includes one or more computer instructions. When the computer instructions are loaded and executed on a computer, all or some of the procedures or functions according to the embodiments of the present disclosure are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like.

What is claimed is:

1. An object detection model training method, performed by a computing device, wherein the object detection model training method comprises:
   obtaining a training image;
   establishing a backbone network based on the training image;
   obtaining a plurality of feature maps from the backbone network;
   inputting the feature maps into a region proposal network;
   selecting, by the region proposal network based on a region proposal parameter, a plurality of proposal regions from the feature maps;
   inputting feature submaps corresponding to the proposal regions into a classifier;
   detecting, by the classifier, a to-be-detected object in the training image to obtain a detection result based on the feature submaps;
   comparing the detection result with a prior result of the training image;
   exciting at least one of a first model parameter of a convolution kernel of the backbone network, a second model parameter of a convolution kernel of the region proposal network, the region proposal parameter, or a parameter of the classifier based on the comparing;
   duplicating the classifier to obtain at least two classifiers;
   classifying, by the region proposal network, the proposal regions into at least two proposal region sets, wherein each of the at least two proposal region sets comprises at least one proposal region;
   inputting, by the region proposal network, a feature submap corresponding to the at least one proposal region of each of the at least two proposal region sets into one of the at least two classifiers;
   detecting, by each of the at least two classifiers, the to-be-detected object based on another feature submap corresponding to another proposal region comprised in an obtained proposal region set;
   comparing, by each of the at least two classifiers, the detection result with the prior result; and
   exciting, by each of the at least two classifiers, at least one of the first model parameter, the second model parameter, the region proposal parameter, or a parameter of each classifier based on the comparing.

2. The object detection model training method of claim 1, further comprising:
   obtaining a system parameter that comprises a quantity of size clusters of to-be-detected objects in the training image; and
   determining, based on the system parameter, a quantity of classifiers that are obtained through duplication.

3. The object detection model training method of claim 2, further comprising performing clustering on sizes of the to-be-detected objects in the training image, to obtain the quantity of size clusters of the to-be-detected objects in the training image.

4. The object detection model training method of claim 1, further comprising:
   obtaining a system parameter that comprises a training computing capability; and
   determining, based on the system parameter, a quantity of classifiers that are obtained through duplication.

5. The object detection model training method of claim 1, further comprising:
   obtaining a system parameter that comprises a quantity of size clusters of to-be-detected objects in the training image and a training computing capability; and
   determining, based on the system parameter, a quantity of classifiers that are obtained through duplication.

6. The object detection model training method of claim 1, wherein the feature maps comprise at least two feature maps.

7. A computing device system comprising:
   at least one computing device, wherein the at least one computing device comprises:
   a processor; and
   a memory coupled to the processor and storing instructions that, when executed by the processor, cause the computing device system to be configured to:
   obtain a training image;
   establish a backbone network based on the training image;
   obtain a plurality of feature maps from the backbone network;
   input the feature maps into a region proposal network;
   select, by the region proposal network based on a region proposal parameter, a plurality of proposal regions from the feature maps;
   input feature submaps corresponding to the proposal regions into a classifier;
   detect, by the classifier, a to-be-detected object in the training image to obtain a detection result based on the feature submaps;
   compare the detection result with a prior result of the training image;
   excite at least one of a first model parameter of a convolution kernel of the backbone network, a second model parameter of a convolution kernel of the region proposal network, the region proposal parameter, or a parameter of the classifier based on the comparing;
   duplicate the classifier to obtain at least two classifiers;
   classify, by the region proposal network, the proposal regions into at least two proposal region sets, wherein each of the at least two proposal region sets comprises at least one proposal region;
   input, by the region proposal network, a feature submap corresponding to the at least one proposal region of each of the at least two proposal region sets into one of the at least two classifiers;
   detect, by each of the at least two classifiers, the to-be-detected object based on another feature submap corresponding to another proposal region comprised in an obtained proposal region set;
   compare, by each of the at least two classifiers, the detection result with the prior result; and
   excite, by each of the at least two classifiers, at least one of the first model parameter, the second model parameter, the region proposal parameter, or a parameter of each classifier based on the comparing.

8. The computing device system of claim 7, wherein the instructions further cause the processor to be configured to:
   obtain a system parameter that comprises a quantity of size clusters of to-be-detected objects in the training image; and
   determine, based on the system parameter, a quantity of classifiers that are obtained through duplication.

9. The computing device system of claim 8, wherein the instructions further cause the processor to be configured to perform clustering on sizes of the to-be-detected objects in the training image to obtain the quantity of size clusters of the to-be-detected objects in the training image.

10. The computing device system of claim 7, wherein the instructions further cause the processor to be configured to:
obtain a system parameter that comprises a training computing capability; and
determine, based on the system parameter, a quantity of classifiers that are obtained through duplication.

11. A computer program product comprising computer-executable instructions stored on a non-transitory computer-readable medium that, when executed by a processor, cause a computing device to:
obtain a training image;
establish a backbone network based on the training image;
obtain a plurality of feature maps from the backbone network;
input the feature maps into a region proposal network;
select, by the region proposal network based on a region proposal parameter, a plurality of proposal regions from the feature maps;
input feature submaps corresponding to the proposal regions into a classifier;
detect, by the classifier, a to-be-detected object in the training image to obtain a detection result based on the feature submaps;
compare the detection result with a prior result of the training image;
excite at least one of a first model parameter of a convolution kernel of the backbone network, a second model parameter of a convolution kernel of the region proposal network, the region proposal parameter, or a parameter of the classifier based on the comparing;
duplicate the classifier to obtain at least two classifiers;
classify, by the region proposal network, the proposal regions into at least two proposal region sets, wherein each of the at least two proposal region sets comprises at least one proposal region;
input, by the region proposal network, a feature submap corresponding to the at least one proposal region of each of the at least two proposal region sets into one of the at least two classifiers;
detect, by each of the at least two classifiers the to-be-detected object based on another feature submap corresponding to another proposal region comprised in an obtained proposal region set;
compare, by each of the at least two classifiers, the detection result with the prior result; and
excite, by each of the at least two classifiers, at least one of the first model parameter, the second model parameter, the region proposal parameter, or a parameter of each classifier based on the comparing.

12. The computer program product of claim 11, wherein the instructions further cause the computing device to:
obtain a system parameter that comprises a quantity of size clusters of to-be-detected objects in the training image; and
determine, based on the system parameter, a quantity of classifiers that are obtained through duplication.

13. The computer program product of claim 12, wherein the instructions further cause the computing device to perform clustering on sizes of the to-be-detected objects in the training image to obtain the quantity of size clusters of the to-be-detected objects in the training image.

14. The computer program product of claim 11, wherein the instructions further cause the computing device to:
obtain a system parameter that comprises a training computing capability; and
determine, based on the system parameter, a quantity of classifiers that are obtained through duplication.

15. An object detection model training method, performed by a computing device, wherein the object detection model training method comprises:
extracting, by a backbone network, a plurality of feature maps from a training image;
selecting, by a region proposal network, a plurality of proposal regions from the feature maps;
inputting feature submaps corresponding to the proposal regions into a classifier;
detecting, by the classifier, a to-be-detected object in the training image to obtain a detection result based on the feature submaps;
comparing the detection result with a prior result of the training image;
exciting at least one of the backbone network, the region proposal network, or the classifier based on the comparing;
establishing at least two classifiers obtained by duplicating the classifier;
classifying, by the region proposal network, the proposal regions into at least two proposal region sets, wherein each of the at least two proposal region sets comprises at least one proposal region;
inputting a feature submap corresponding to the at least one proposal region comprised in each of the at least two proposal region sets into one of the at least two classifiers;
detecting, by each of the at least two classifiers, the to-be-detected object in the training image based on an obtained feature submap;
comparing, by each of the at least two classifiers, the detection result with the prior result; and
re-exciting, by each of the at least two classifiers, at least one of the backbone network, the region proposal network, or the classifier based on the comparing.

16. The object detection model training method of claim 15, further comprising:
obtaining a system parameter that comprises at least one of a quantity of size clusters of to-be-detected objects in the training image or a training computing capability; and
determining, based on the system parameter, a quantity of the at least two classifiers obtained through duplication.

17. The object detection model training method of claim 16, further comprising perfroming clustering on sizes of the to-be-detected objects in the training image to obtain the quantity of size clusters of the to-be-detected objects in the training image.

18. The object detection model training method of claim 15, further comprising:
obtaining a system parameter that comprises a training computing capability; and
determining, based on the system parameter, a quantity of the at least two classifiers obtained through duplication.

19. The object detection model training method of claim 15, further comprising:
obtaining a system parameter that comprises at least one of a quantity of size clusters of to-be-detected objects in the training image and a training computing capability; and determining, based on the system parameter, a quantity of the at least two classifiers obtained through duplication.

20. The object detection model training method of claim 15, wherein the feature maps comprise at least two feature maps.

* * * * *